US008330650B2

(12) United States Patent
Goldman

(10) Patent No.: US 8,330,650 B2
(45) Date of Patent: Dec. 11, 2012

(54) RADAR SYSTEM AND ANTENNA WITH DELAY LINES AND METHOD THEREOF

(75) Inventor: Geoffrey Howard Goldman, Ellicott City, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 159 days.

(21) Appl. No.: 12/775,687

(22) Filed: May 7, 2010

(65) Prior Publication Data
US 2011/0273325 A1 Nov. 10, 2011

(51) Int. Cl.
*G01S 13/08* (2006.01)
*G01S 13/00* (2006.01)
*G01S 13/52* (2006.01)
(52) U.S. Cl. ......... 342/160; 342/146; 342/147; 342/162
(58) Field of Classification Search .......... 342/128–133, 342/146, 147–162, 375
See application file for complete search history.

(56) References Cited

U.S. PATENT DOCUMENTS

| | | | | |
|---|---|---|---|---|
| 3,882,498 A | * | 5/1975 | McGuffin | 342/91 |
| 3,924,236 A | * | 12/1975 | Earp et al. | 342/147 |
| 4,176,351 A | * | 11/1979 | DeVita et al. | 342/111 |
| 4,234,940 A | * | 11/1980 | Iinuma | 367/105 |
| 4,656,642 A | * | 4/1987 | Apostolos et al. | 375/139 |
| 4,673,942 A | * | 6/1987 | Yokoyama | 342/368 |
| 4,963,816 A | * | 10/1990 | Tsui et al. | 324/76.35 |
| 4,977,365 A | * | 12/1990 | Tsui et al. | 324/76.39 |
| 5,012,254 A | * | 4/1991 | Thompson | 342/373 |
| 5,063,390 A | * | 11/1991 | Konig | 342/375 |
| 5,084,708 A | * | 1/1992 | Champeau et al. | 342/377 |
| 5,291,125 A | * | 3/1994 | Tsui et al. | 324/76.22 |
| 5,315,307 A | * | 5/1994 | Tsui et al. | 342/444 |
| 5,325,101 A | * | 6/1994 | Rudish et al. | 342/373 |
| 5,359,934 A | * | 11/1994 | Ivanov et al. | 102/214 |
| 5,414,433 A | * | 5/1995 | Chang | 342/375 |
| 5,431,568 A | * | 7/1995 | Fey et al. | 434/2 |
| 5,440,228 A | * | 8/1995 | Schmidt | 324/76.12 |
| 5,479,177 A | * | 12/1995 | Rudish et al. | 342/375 |
| 5,493,306 A | * | 2/1996 | Rudish et al. | 342/371 |
| 5,497,161 A | * | 3/1996 | Tsui | 342/147 |

(Continued)

OTHER PUBLICATIONS

J.T. Bernhard, etal, "Wideband random phased arrays: theory and design", Wideband and Multi-band Antennas and Arrays, 2005.

(Continued)

*Primary Examiner* — Jack W Keith
*Assistant Examiner* — Peter Bythrow
(74) *Attorney, Agent, or Firm* — Lawrence E. Anderson

(57) ABSTRACT

A radar system, apparatus, and method includes at least one radar transmitter for transmitting an electromagnetic waveform; a receiving antenna comprising a plurality of receiving antenna elements and delay lines, each of the plurality of receiving antenna elements receiving the return signal operatively associated with a predetermined delay line; each delay line having a delay length which produces a different phase delay in the return signal; the different phase delays producing substantially different antenna patterns for the received signal at a given frequency; at least one processor operatively connected to receive data from the plurality of delay lines; the at least one processor operating to analyze the substantially different beam patterns for a given frequency; whereby the processing of the data produces results indicating the presence and location of a target.

20 Claims, 16 Drawing Sheets
(10 of 16 Drawing Sheet(s) Filed in Color)

U.S. PATENT DOCUMENTS

| | | | |
|---|---|---|---|
| 5,518,400 A * | 5/1996 | Otoide et al. | 434/4 |
| 5,808,580 A * | 9/1998 | Andrews, Jr. | 342/162 |
| H1773 H * | 1/1999 | Cheston et al. | 342/375 |
| 5,943,008 A * | 8/1999 | Van Dusseldorp | 701/470 |
| 5,977,911 A * | 11/1999 | Green et al. | 342/375 |
| 6,198,436 B1 * | 3/2001 | Rudish | 342/424 |
| 6,232,910 B1 * | 5/2001 | Bell et al. | 342/70 |
| 6,411,076 B1 * | 6/2002 | Rudish | 324/76.54 |
| 6,989,788 B2 * | 1/2006 | Marion et al. | 342/375 |
| 7,525,477 B2 * | 4/2009 | Kurashima et al. | 342/135 |
| 7,649,492 B2 * | 1/2010 | Wilens et al. | 342/174 |
| 7,738,598 B1 * | 6/2010 | Lopata et al. | 375/316 |
| 8,077,111 B2 * | 12/2011 | Derneryd et al. | 343/853 |
| 2003/0080899 A1 * | 5/2003 | Lee et al. | 342/368 |
| 2006/0158370 A1 * | 7/2006 | Kurashima et al. | 342/118 |
| 2007/0296625 A1 * | 12/2007 | Bruzzone et al. | 342/13 |
| 2008/0252524 A1 * | 10/2008 | Chu et al. | 342/375 |
| 2010/0283659 A1 * | 11/2010 | Huggett | 342/20 |
| 2010/0302091 A1 * | 12/2010 | Bruzzone et al. | 342/162 |
| 2011/0273325 A1 * | 11/2011 | Goldman | 342/146 |

OTHER PUBLICATIONS

Y. T. Lo, "A mathematical theory of antenna arrays with randomly spaced elements," IEEE Trans. on Antennas and Prot., vol. 12, pp. 257-268, Mar. 1964.

C.E. Shannon, "A Mathematical Theory of Communication," Bell System Technical Journal, vol. 27, pp. 379-423, 623-656, Jul., Oct. 1948.

Ishimaru, A.; Tuan, H.-S. "Theory of frequency scanning of antennas" Antennas and Propagation, IRE Transactions on vol. 10, Issue: 2 Digital Object Identifier: 10.1109/TAP.1962.1137834 (1962) pp. 144-150.

Nelder J A & Mead R. A simplex method for function minimization. Comput. J. 7:308-13, 1965.

U.S. Statutory Invention Registration No. H 1773, Cheston, et al. "Ultra-Wideband Electronically Scanned Antenna.".

* cited by examiner

Conceptually, if one adds the curves associated with F1 times F2: then if equal to zero then orthogonal. If frequencies are orthogonal, the result at a target will be a "maximum" provided the filters are matched.

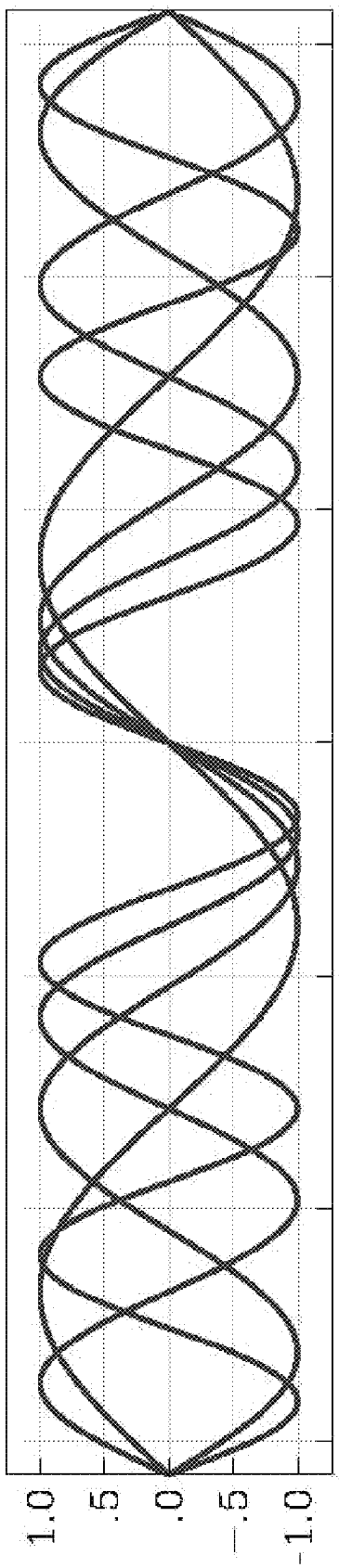
SINE BEAM PATTERNS
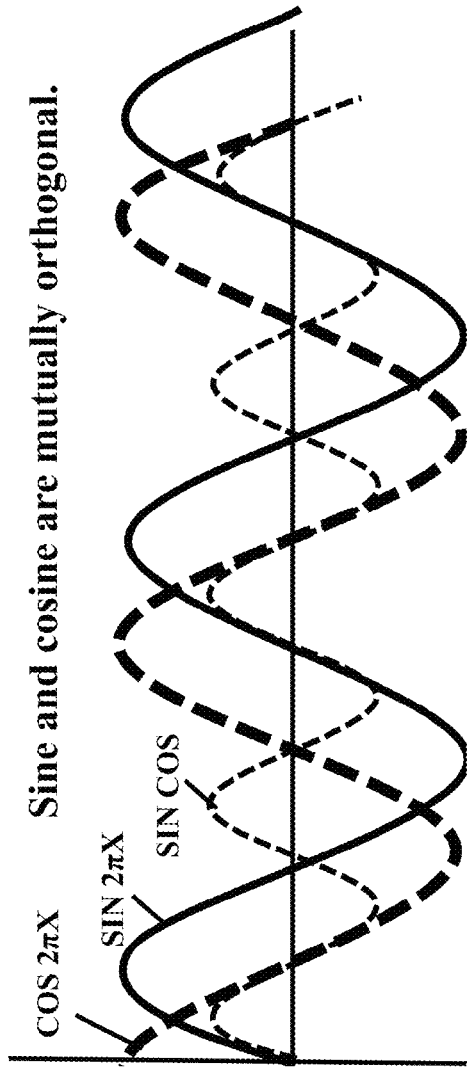
Sine and cosine are mutually orthogonal.
FIG. 16
TO TEST FOR ORTHGONALITY – THE WAVEFORMS ARE FIRST MULTIPLIED TOGETHER. THEN, IF ORTHOGONAL, THE PRODUCT, OVER THE INTERVAL, SUMS TO ZERO.

RADAR SYSTEM AND ANTENNA WITH DELAY LINES AND METHOD THEREOF

GOVERNMENT INTEREST

The embodiments herein may be manufactured, used, and/or licensed by or for the United States Government without the payment of royalties thereon.

BACKGROUND OF THE INVENTION

Moving target indicator radars have been used to detect and track targets since World War II. In searching for targets, a narrow beam is typically scanned through a large area of interest. Radar searches in years after WWII were mechanically performed by rotating an antenna on a gimbal. For more recently developed systems, the beam is scanned electronically with a phased array antenna using switches, ferroelectric, or other active devices. Phased array antennas can be expensive and consume large amounts of power. Another less expensive approach for scanning a radar beam is to use a frequency scanning antenna. In systems using frequency scanning antennas, there is a trade-off between generally good angular resolution in exchange for poor range resolution. Frequency scanning antennas, however, do not typically support 2-D scanning and high range resolution system requirements. Consequently, radars using frequency scanning antennas have poor range resolution but good angular resolution.

Numerous techniques have been developed to reduce the cost, size, and power requirements of electronically scanning antennas (ESA). One technique to reduce the cost is to aperiodically place a smaller number of antenna elements across an aperture as described in more detail in J. T. Bernhard, et al, "Wideband random phased arrays: theory and design", Wideband and Multi-band Antennas and Arrays, 2005, hereby incorporated by reference. This technique that has been shown to be feasible based upon performance metrics such as peak sidelobe level as described in Y. T. Lo, "A mathematical theory of antenna arrays with randomly spaced elements," IEEE Trans. on Antennas and Prot., vol. 12, pp. 257-268, March 1964, hereby incorporated by reference (hereinafter "Lo Mathematical Theory Article"). The "Lo Mathematical Theory Article," explores the possibility of a large antenna array with randomly spaced elements and finds the required number of elements is closely related to the desired sidelobe level and is almost independent of the aperture dimension, the resolution (or the beam width) depends mainly on the aperture dimension, and the directive gain is proportional to the number of elements used if the average spacing is large. The "Lo Mathematical Theory Article" points to then recent advances in space exploration as having shown a great need for antennas with high resolution, high gain and low sidelobe level. Although the "Lo Mathematical Theory Article" touches upon the use of "high speed computers," the focus is on a technique for optimizing the design of phased arrays.

In the radar system disclosed in Statutory Invention Registration No. H1773, entitled Ultra-wideband Active Electronically Scanned Antenna, the elements are spaced by $\lambda/2$ and the maximum delay corresponds to 360° of phaseshift. The various lines feeding the elements of the array at the aperture have bias delays that make them all equal in length, thereby giving a broadside beam.

SUMMARY

A preferred embodiment of the present invention provides a radar system with both good range and angular resolution at low cost and low power while having Electronically Scanning Array (ESA) capability without requiring elaborate phase shifters or other high cost precision active elements. A preferred embodiment is a radar system architecture comprising a plurality of receiving frequency scanning antenna elements operatively connected to delay lines whose lengths are somewhat randomly selected. The inputted (received) signal data is processed using digital signal processing algorithms. This architecture uses temporal diversity rather than spatial diversity to reduce the cost and improve the performance on the system.

Conceptually, substantially orthogonal beam patterns at the receive antenna are generated at each frequency with varying levels of energy spread spatially across the single element antenna pattern. Then, signal processing algorithms, based upon techniques such as least squares and maximum likelihood can be used to detect and track the targets of interest. From information theory, the maximum information content of a signal is obtained when the data has a uniform distribution and minimum information content when the data has a delta-like distribution. See C. E. Shannon, "A Mathematical Theory of Communication," Bell System Technical Journal, vol. 27, pp. 379-423, 623-656, July, October, 1948, for a detailed description (hereby incorporated by reference as though fully rewritten herein. Traditionally, antenna patterns are delta-like functions, which are scanned across a field of view. More information about the targets is obtainable using a series of patterns that have distributions more closely resembling a uniform distribution.

A preferred embodiment architecture is based upon a 1-D linear array feed with predetermined fixed length lines (producing phase shifts; preferably selected with uniform distribution). The major advantages of a preferred embodiment architecture are a simple radar RF design, an antenna with no active elements, and a data acquisition system may be comprised of a single analog-to-digital converter (ADC). Previously, disadvantages associated with systems of this nature included the drawbacks of more complicated signal processing, reduction of the effective signal processing gain associated with the antenna system relative to a similar sized antenna, and increased potential ambiguities associated with target localization.

The radar system of a preferred embodiment comprises input and output developed with the goal of having near orthogonal beams as a function of frequency in the receiving antenna subsystem. Orthogonal beam patterns are illustrated in FIG. 16. The inventive concept embodied in a preferred embodiment supports arbitrary waveforms and arbitrary antenna placement. Unlike the electronically scanned antenna disclosed Statutory Registration No. H1773, there is no need make the elements of the array with bias delays all equal in length. Instead, the antenna element placement does not require positioning in an symmetrical, equally spaced array as set forth in Statutory Registration No. H1773, but instead enables irregular, nonplanar, or arbitrary placement of the antenna elements on objects which are irregular or atypical radar supporting positions. The preferred waveform generator 30 generates a continuous wave (CW) stepped-frequency waveform; as depicted in the block diagram in FIG. 1. In FIG. 1, the radar signal is transmitted through a single antenna and received with an array of antenna elements that are combined with feed lines of somewhat "random" length (relative to conventional systems). The received signal is amplified, down converted, then smoothed with a band pass filter (BPF). A preferred embodiment can be provided such that only signals from targets moving at a sufficient velocity will pass to the ADC. The element antenna patterns for both transmit and receive antenna elements are substantially identical, with the system processing enough information to track moving targets in stationary clutter.

The velocity of the targets can be determined by performing a discrete Fourier transform (DFT) on the time samples collected at each frequency. Conceptually, the range information on moving targets can be obtained by performing a DFT across the Doppler processed results after motion compensation and windowing. Conceptually, the angle of the targets can be determined using techniques such as matched filter processing or least squares estimation. To estimate target parameters, stochastic optimization techniques can be developed. The feasibility of estimating the target parameters is determined by analyzing a cost function based upon the Euclidian norm.

The radar system comprises a receiving antenna array comprising a plurality of receiving antenna elements for receiving previously transmitted electromagnetic waves reflected from targets and a plurality delay lines (the plurality of delay lines and antenna elements may be equal in number and coupled together; each delay line may be of random length), each of the plurality of receiving antenna elements being operatively associated with a predetermined delay line; each delay line having a delay length which produces a different phase delay; the different phase delays producing substantially orthogonal waveform data. Optimally, the waveform data from each delay line is substantially orthogonal to the waveform data from each other delay line. Accordingly, a preferred embodiment set of delay lines provide delays or phase shifts in the range of $20\lambda$; with intervals of delays between the delay lines being substantially uniform. For example, in the case of 40 antenna elements, each delay line would have a delay of at least $\lambda/2$ from each other delay line.

A preferred embodiment radar system may further comprise an amplifier coupled to the plurality of delay lines for amplifying the antenna signal data; a down-converter coupled to the amplifier which down-converts the amplified antenna signal data; a data acquisition system coupled to the down-converter for detecting the targets, and a processing system. The data acquisition system may comprise an analog-to-digital converter which converts the down-converted antenna signal data to digital antenna signal data. The processing system (coupled to the data acquisition system) detects and localizes the targets and estimates a position and velocity of the targets.

The system may include a band pass filter coupled to the amplifier and the down-converter, for filtering, inter alia, the amplified antenna signal data. The down-converter down-converts at least one of filtered antenna signal data and amplified antenna signal data. In addition, the data acquisition system may further comprise a digital signal processor coupled to the analog-to-digital converter, wherein the digital signal processor detects and localizes the targets from the digital antenna signal data.

In a preferred embodiment, at least one processor or processing system may estimate angle, range, and velocity of the targets. The angle of the targets may be estimated by a matched filter and/or minimizing a weighted square error. Furthermore, at least one processor or processing system may estimate at least one of a velocity and a position of the detected targets. In addition, at least one processor or processing system may calculate a statistical optimization to determine at least one of a velocity and a position of a target, and the statistical optimization may be used to calculate a minimum value to a cost function formulation. Optionally, at least one processor or processing system may comprise a digital signal processor.

Another embodiment comprises an antenna array fed with randomly selected delay lines, comprising a plurality of antenna elements; a plurality of delay lines which may be of random length, each operatively connected to an antenna element; a data acquisition system coupled to the plurality of delay lines comprising an analog-to-digital converter; and a digital signal processor processing the electromagnetic wave data; and a processing system coupled to the data acquisition system, wherein the processing system detects the target and outputs location information of the target. The plurality of antenna elements may comprise a linear array or be positioned in a nonplanar configuration. Moreover, there may be non-linear (or different) spacing between the plurality of antenna elements. Additionally, at least one processor or e processing system may estimate an angle of the target by at least one of a matched filter and minimizing a weighted square error. In addition, at least one processor or processing system may estimate at least one of a velocity and a position of the target. Additionally, the analog-to-digital converter of the data acquisition system may comprise a single slow-speed analog-to-digital converter.

An amplifier may be utilized to amplify the gathered electromagnetic wave data. The processing system may be remotely located from the antenna array.

A preferred methodology comprises determining location information of a target from electromagnetic wave data, comprising receiving the electromagnetic wave data from a antenna array with randomly selected delay lines; amplifying the received electromagnetic wave data; down-converting the received electromagnetic wave data; filtering the received electromagnetic wave data; and processing the received electromagnetic wave data to determine the location information. The processing step may comprise performing a discrete Fourier Transform on time samples of the received electromagnetic wave data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments herein will be better understood from the following detailed description with reference to the following drawings.

FIG. 16 illustrates antenna beam patterns represented by sine waves (upper portion); and sine and cosine waves which are mutually orthogonal (lower portion).

DETAILED DESCRIPTION OF THE PREFERRED EMBODIMENTS

Figure 1:
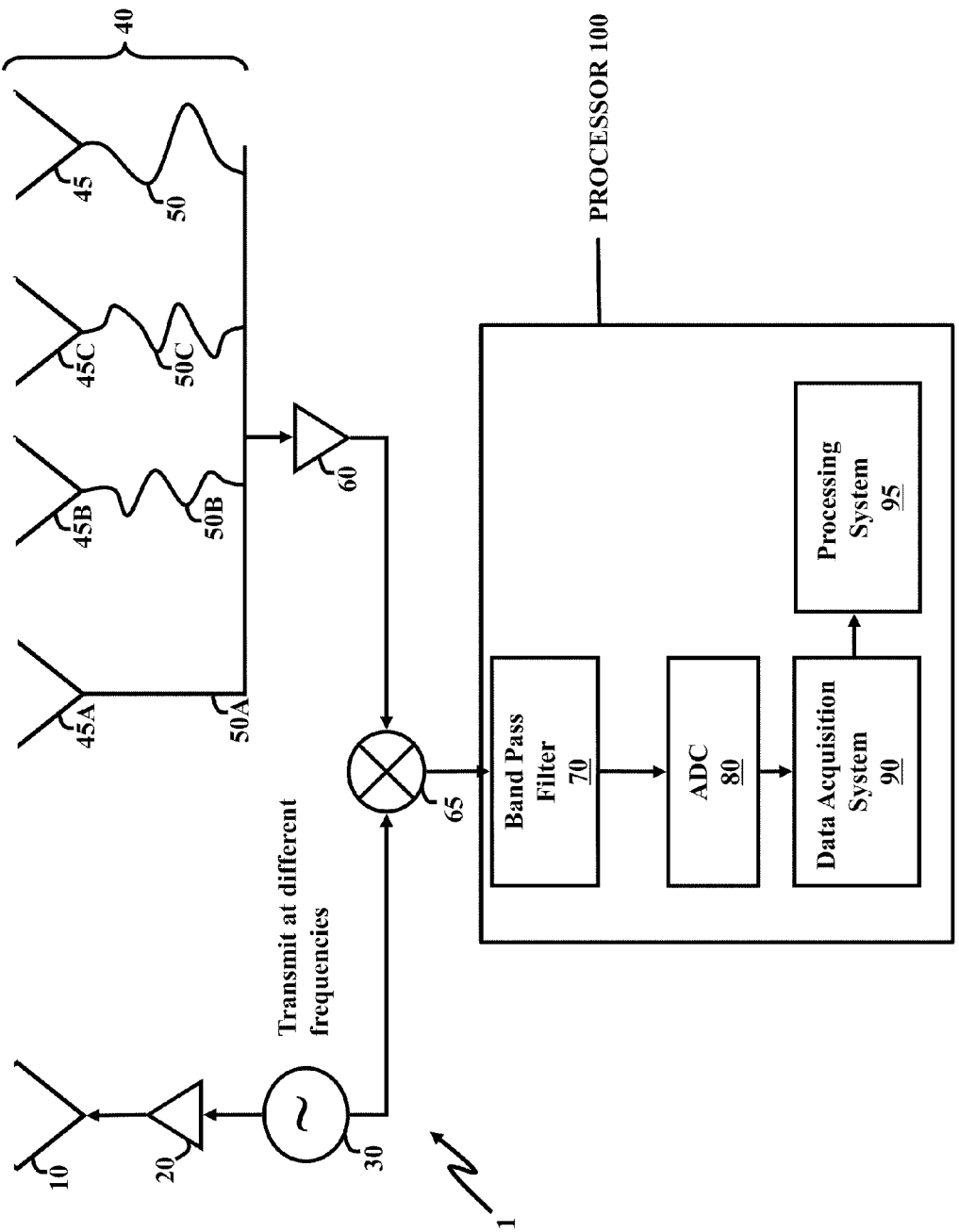
FIG. 1 illustrates a schematic diagram of a radar system according to an embodiment herein.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various ranges, elements, components, regions, layers and/or sections, these elements, components, regions, layers and/or sections should not be limited by these terms. For example, when referring first and second ranges, these terms are only used to distinguish one range from another range. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein provide a cost efficient radar system with both good range and angular resolution, in addition to simultaneously searching for multiple targets. Referring now to the drawings, where similar reference characters denote corresponding features consistently throughout the figures, there are shown preferred embodiments.

As noted above, embodiments described herein are cost efficient and have both good range and angular resolution in addition to simultaneously searching for multiple targets. The embodiments described below may utilize RF waveforms and may be constructed with no active elements, and the data acquisition system that may include a single slow-speed analog-to-digital converter.

FIG. 1 illustrates a schematic diagram of radar system 1 according to an embodiment herein. As shown in FIG. 1, radar system 1 may include a transmitting antenna 10, transmitting amplifier 20, continuous wave (CW) waveform generator that is stepped in frequency 30, receiving antenna array 40, receiving amplifier 50, an optional band pass filter 70, an analog-to-digital converter ("ADC") 80 and a data acquisition system 90. As shown in the embodiment of FIG. 1, receiving antenna array 40 includes a plurality of receiving antenna elements 45, where each receiving antenna element 45 is coupled to a delay line 50. According to one embodiment described herein, receiving antenna array 40 receives electromagnetic wave data, which includes frequency variations in electrical fields and magnetic fields, etc. In addition, in one embodiment, the length of each delay line 50 may be of different lengths, arbitrarily selected such the delay intervals are substantially equally spaced to produce waveform pattern from each delay line which is substantially orthogonal to the waveform pattern from every other antenna element and delay line 50. A receiving amplifier 60 may be used for amplification. Radar system 1 also include a down-converter 65, which includes a digital down-converter (not shown) and coupled and/or configured to accept input from CW waveform generator 30 and receiving amplifier 60 and coupled and/or configured to produce output to band pass filter 70. Processing subsystem 95 (e.g., a digital signal processor) is also shown in FIG. 1 that processes the output of ADC 80, as described in further detail below.

To facilitate signal processing, a preferred embodiment radar system 1 may be based upon a CW stepped-frequency waveform (e.g., generated from CW waveform generator 30). The generated signal is then transmitted through an antenna (e.g., transmitting antenna 10) and received with a plurality of antenna elements (e.g., receiving antenna array 4) that are combined with delay lines (e.g., delay lines 50) of varying length. The received signal may be amplified (e.g., via receiving amplifier 60), down-converted (e.g., via digital down-converter 65, then smoothed with a band pass filter (e.g., band pass filter 70). After the received signal is amplified, down-converted and smoothed, excessive noise is removed and only signals reflected from moving targets will pass to an analog-to-digital converter (e.g., analog-to-digital converter 80) and processed to obtain location information. Location information may include, but is not limited to, the latitude, longitude, elevation, velocity and/or acceleration, etc. of a target or targets.

The performance of radar system 1 may be improved in a number of different ways which includes increases in the percent bandwidth of the waveform, the length of the time delays attributable delay lines 50 (as described in further detail below), and the number of antenna elements in antenna array 40; for example 64 receiving antenna elements. In addition, performance improvements may be achieved by incorporating multiple subarrays, where each subarray includes its own antenna array 40 with a dedicated ADC 80. In addition, processing subsystem 95 may be remotely located from antenna array 40. For example, while not shown, Doppler detections (as discussed in further detail below) that exceed an adaptive threshold could be wirelessly transmitted to a central computer (not shown in FIG. 1) for further processing. Transmitting to a central computer (not shown in FIG. 1) may reduce the cost, size, and power requirements of radar system 1 and allow lightweight antenna arrays to be widely distributed without requiring extensive possessing capabilities at each antenna array site. Although the power, size, and cost of the central computer system (not shown in FIG. 1) are unconventional compared to traditional radar systems and may be larger than traditional radar systems, such a central computer system could serve multiple roles and be located in a secure and remote location with adequate resources.

As described in further detail below, radar system 1 captures enough information for processing subsystem 95 to track moving targets in stationary clutter. In addition, as described in further detail below, embodiments of the data acquisition system described herein may also determine the velocity of the targets by performing a discrete Fourier transform ("DFT") on the time samples collected at each frequency. The range information on moving targets may be obtained by performing a DFT across the Doppler processed results. Various unconventional effects, such as aliasing, quadratic errors, and large amplitude modulations on the Doppler processed data, limit the use of DFT processing techniques in the embodiment shown in FIG. 1. In addition, as described in further detail below, the angle of the targets can be determined using various estimation techniques; for example, matched filter processing and least squares estimation. Moreover, stochastic optimization techniques are described below to simultaneously estimate various target parameters using a cost function based upon the Euclidian norm. Embodiments described herein, however, are not limited to the optimization techniques described below and other optimization techniques are known to those skilled in the art and can be utilized without undue experimentation.

Figure 2:
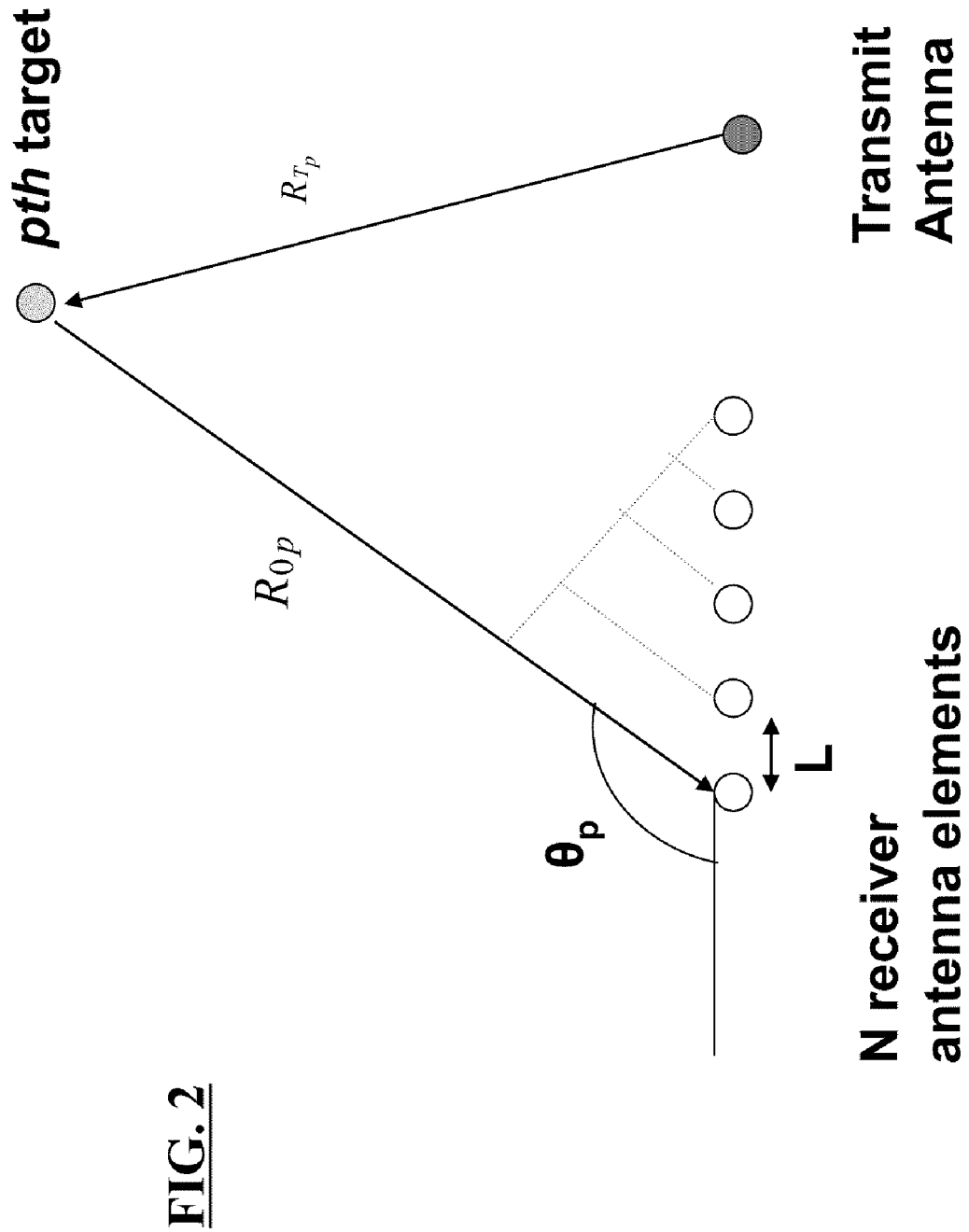
FIG. 2 is an illustration of the geometry associated with a 1-D array with N antenna elements for the pth target.

In operation, the continuous waveform generator 30 that is stepped in frequency transmits a beam pattern through the transmitting antenna 10. Upon striking a target or the like, the return of the varying frequency beam pattern to array 45A-45D will give antenna patterns at different frequencies. Although 4 antenna elements are shown in FIG. 1, the present invention is not limited to 4 antenna elements and may comprise, for example, 64 antenna elements. FIG. 2 illustrates the transmitted radar beam $R_{Tp}$ and the beam $R_{Op}$ reflected from the pth target. Conceptually, orthogonal beam patterns at the receiver antenna will be generated at each frequency with varying levels of energy spread spatially. When adding up signals from targets at different angles, the data will experience random constructive and destructive interference. In theory, if a target is present and the waveforms are orthogonal, then a maximum will be produced indicating the presence of a target. Conversely, in theory, the orthogonal waveforms will sum to zero when a target is not present. The orthogonal feature is derived from the long delay lines. Each delay line puts a different phase shift on the signal. In a preferred embodiment, the delay lines are structured such that there is a variance from 10λ to 30λ (each λ being 360°). The delay lines can be varied to produce varying delays, for example, by varying the length of the lines. The delay lines produce a phase shift which changes as a function of frequency. In addition, each antenna element 45A-45D will receive data at a multiplicity of angles depending on the location of the target(s). The data in essence presents a nonlinear problem to be solved to resolve target presence and/or location. A preferred embodiment may use a cost function analysis to derive or substantiate the target presence and/or location.

Elements used to produce the delay may include ferroelectric phase shift elements. For example, a delay may be produced by applying a voltage to a ferroelectric material. As to the number of delay lines and elements 45A-45X, there could be 64 delay lines and antenna elements, uniformly varied from ten to thirty λ.

As used herein, the terminology "nonlinear problem solving" or "nonlinear programming," in the context of mathematical solutions, is the process of solving a system of equalities and inequalities, collectively termed constraints, over a set of unknown real variables, along with an objective function to be maximized or minimized, where some of the constraints or the objective function are nonlinear.

Figure 11:
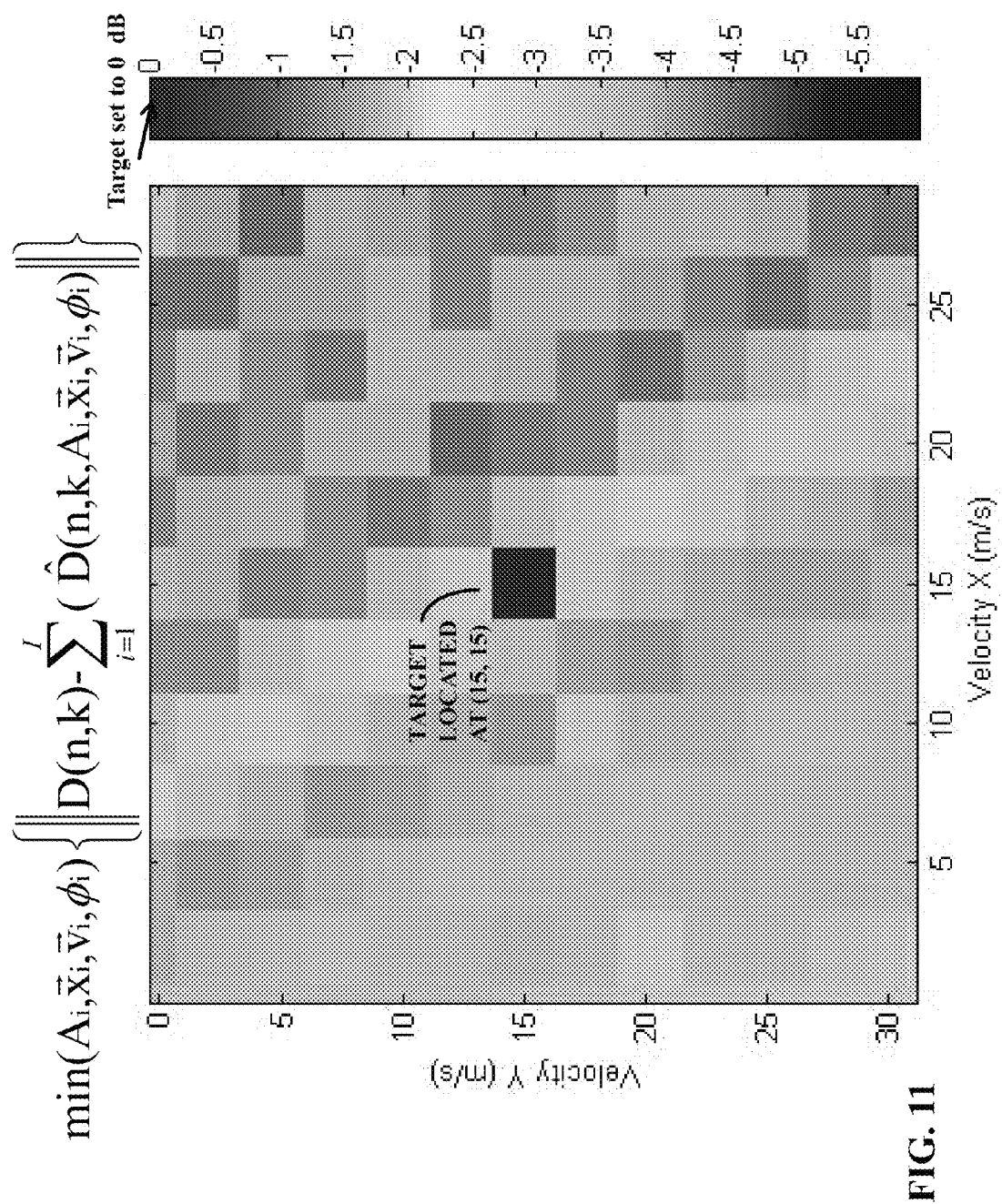
FIG. 11 illustrates function example zoomed in for a single target with a velocity vector of (15,15) m/s.

As used herein the terminology "cost function analysis" or "function value analysis" means the derivation of a solution using nonlinear problem solving for the purpose of optimizing a parity between system's functions or properties (also known as value) and "costs" associated with those functions or properties. In FIG. 11, for example, the X velocity and Y velocity are plotted on the x and y axis. The color range is shown to the right where the target is set to 0 dB (corresponding to red) to over 5.5 dB (corresponding to the color dark blue). The target "appears" in FIG. 11 in red at a location 15, 15 corresponding to a target having and x and y velocity of 15 m/sec.

Analysis of the 1-D antenna patterns provide insight into more complicated system identification problems. 1-D antenna patterns were simulated and analyzed for a radar system similar to the block diagram shown in FIG. 1. For stationary targets, the bandpass filter 70 shown in FIG. 1 was removed. The geometry associated with a 1-D array with N antenna elements for the pth target is shown in FIG. 2.

For a step frequency waveform, the returned normalized electric field from P stationary point scatter targets in the x-y plane is given by Equation (1):

$$E(m) = \sum_{p=1}^{P} \sum_{n=0}^{N-1} A_p e^{-j\left[2\pi\left(\frac{f_0+m\Delta f}{c}\right)\left(R_{Tp}+r_p(n)\right)\right]} \quad (1)$$

where E(m) is the normalized electric field for the $m^{th}$ frequency (ranging from 0 to M−1), p is the target number (ranging from 1 to P), n is the antenna element number (0 to N−1), $f_0$ is the carrier frequency, $\Delta f$ is the frequency step size, c is the speed of light, $R_{Tp}$ is the range from the transmit antenna to the $p^{th}$ target, and:

$$r_p(n) = R_{op} + nL \cos \theta_p + d_n + K \quad (2)$$

is the range from the $p^{th}$ target to the analog to digital converter (ADC) for the $n^{th}$ antenna element, $R_{op}$ is the range from the left most receive antenna element in the array to the $p^{th}$ target, L is the separation between antenna elements in a linear array, $\theta_p$ is the angle to the $p^{th}$ target from the receive antenna, and $d_n$ is length of the $n^{th}$ delay line, and K is an arbitrary constant (which may be zero).

From measurements of E(m), an estimate is obtained of the angle of arrival, θp for each target. A standard approach to estimate θp is to use a bank of matched filters. The matched filter output can be described as an inner product between the measured data and the selected matched filter as shown below $$A(\theta_q) = \langle E(m), w_{\theta_q}(m) \rangle \quad (3)$$

where $w_{\theta_q}(m)$ is the normalized electric field for a single point target at an angle of $\theta_q$, range of zero; calculated using Equation (1). It is desired to have the maximum response in Equation (3) when the data and the matched filter are at the same angles and zero when they are at significantly different angles. The response of the match filter calculate for the pth target before the summation over frequency is given by $$\sum_{m=0}^{M-1} E(m) w_{\theta_q}^*(m) = \quad (4)$$

$$C \sum_{m=0}^{M-1} \left[ \left[ \sum_{n=0}^{N-1} e^{-j2\pi\left(\frac{f_0+m\Delta f}{c}\right)(R_{T_p}+R_{0_p}+nL\cos\theta_p+d_n+K)} \right] \left[ \sum_{n=0}^{N-1} e^{-j2\pi\left(\frac{f_0+m\Delta f}{c}\right)(nL\cos\theta_q+d_n)} \right]^* \right]$$

where C is a constant and * is the complex conjugate. After some algebraic manipulation of Equation (4), the following is obtained:

$$\sum_{m=0}^{M-1} E(m) w_{\theta_q}^*(m) = C \sum_{m=0}^{M-1} e^{j2\pi\left(\frac{f_0+m\Delta f}{c}\right)(R_{T_p}+R_{0_p})} \quad (5)$$

$$\begin{pmatrix} \sum_{n=0}^{N-1} e^{j2\pi\left(\frac{f_0+m\Delta f}{c}\right)}(L(\cos\theta_p - \cos\theta_q)n) + \\ 2\sum_{n=0}^{N-2} e^{j2\pi\left(\frac{f_0+m\Delta f}{c}\right)}(L(\cos\theta_p - \cos\theta_q)n + (d_n - d_{n+1}) - L\cos\theta_p) + \\ 2\sum_{n=0}^{N-3} e^{j2\pi\left(\frac{f_0+m\Delta f}{c}\right)}(L(\cos\theta_p - \cos\theta_q)n + (d_n - d_{n+2}) - 2L\cos\theta_p) + \\ \vdots \\ e^{j2\pi\left(\frac{f_0+m\Delta f}{c}\right)}((d_0 - d_{N-1}) - (N-1)L\cos\theta_p) \end{pmatrix}$$

Ideally, one would like the terms on the left hand side of Equation (5) to add to zero or near zero for $\theta_p \neq \theta_q$. This would result in a beam pattern with no or small sidelobes. It is desirable to select optimal lengths for the delay lines to minimize the sidelobes calculated from Equation (5). Obtaining this goal is a complex nonlinear problem. One preferred embodiment approach is to use delay lines with a random statistical distribution, then find solutions that minimize the expected value of a cost function. Using this preferred embodiment approach, it is observed that the first term in Equation (5) is independent of the delay line length, so it's expected value cannot be set to zero by randomly varying the lengths of the delay line. An unbiased solution can be obtained by selecting the probability distributions of the delay lines so that the bias from the remaining terms in Equation (5) cancels the first term. However, the realization is subject to difficulties. Another solution is to ignore the bias created by the first term and then statistically minimize the contributions from the remaining terms, which is examined further herein.

A preferred embodiment way to optimize the length of the delay lines 50 is to minimize the expected value of the power in the side lobes from the matched filter processing. The expected value of the contributions from all the terms except the first will be zero if the probability distributions of the phase differences caused by the random delays are uniformly distributed from 0 to 2π for all combinations. However, this distribution is not realizable in hardware. If the delay lines are very long, the distributions will be approximately uniformly distributed due to the modulation of the phase by 2π. This occurs when the length of the delay lines 50 satisfy the equation $$(d_n - d_m)\Delta f/c \gg 1 \quad (6)$$

where n=0, ... N−1 and m=0, ... N−1 for all m and n except when m=n. This is not a requirement, but should provide a best case scenario for an approach based upon statistical optimization. This will result in sidelobe levels (SL) proportional to $$SL = \sum_{m=0}^{M-1} \sum_{n=0}^{N-1} e^{j2\pi\left(\frac{f_0+m\Delta f}{c}\right)(L(\cos\theta_p - \cos\theta_q)n)} \quad (7)$$

$$SL = \sum_{m=0}^{M-1} \left( \frac{1 - e^{j2\pi\left(\frac{f_0+m\Delta f}{c}\right)L(\cos\theta_p - \cos\theta_q)N}}{1 - e^{j2\pi\left(\frac{f_0+m\Delta f}{c}\right)L(\cos\theta_p - \cos\theta_q)}} \right)$$

$$SL = C \sum_{m=0}^{M-1} \left( \frac{\sin\left(\pi\left(\frac{f_0+m\Delta f}{c}\right)L(\cos\theta_p - \cos\theta_q)N\right)}{\sin\left(\pi\left(\frac{f_0+m\Delta f}{c}\right)L(\cos\theta_p - \cos\theta_q)\right)} \right)$$

and a signal strength proportional to NM. In view of the complexity, and difficulty visualizing, simulations were run to gain more insight into the problem.

Specifically, Monte Carlo simulations were conducted to investigate the impact of the line lengths on the 1-D antenna pattern using two approaches. The first approach is based upon match filter processing as previously described. The second approach for estimating the angle of a target is based upon minimizing the weighted squared error between a desired response and a calculated response. The weighted squared error in integral form is given by $$\varepsilon = \int_{-\pi/2}^{\pi/2} |\beta_d(\theta) - s^H v(\theta)|^2 \Gamma(\theta) d\theta \quad (8)$$

where $$v(\theta) = \sum_{n=0}^{N-1} e(-jk(nL\cos\theta + d_n)), \quad (9)$$

$$k = \frac{2\pi(f_0 + m\Delta f)}{c}, \quad (10)$$

and $B_d(\theta)$ is the desired antenna pattern, θ is the azimuth angle, s is a vector of beam forming coefficients, Γ(θ) is the single element pattern for a radiator, and v(θ) is a M×1 array manifold vector that is a function of frequency step number rather than antenna element number, as described in further detailed in H. L. Van Trees, Optimal Antenna Design Part IV, New York: Wiley Interscience, 2002, hereby incorporated by reference. The error is minimized by breaking the integral in Equation (8) into a summation over I intervals, then approximating each interval as a single digital sample. The solution to minimizing the weighted squared error is given by $$s = (H^T W H)^{-1} H^T W \quad (11)$$

where $$H = [v(\theta_1) \; v(\theta_1) \ldots v(\theta_1)], \quad (12)$$

and W is a diagonal matrix with elements given by $\Gamma(\theta_1)$, as described further in S. M. Kay, Fundamentals of Statistical Signal Processing: Estimation theory, Prentice-Hall, 1993, hereby incorporated by reference.

Simulation

Figure 3:
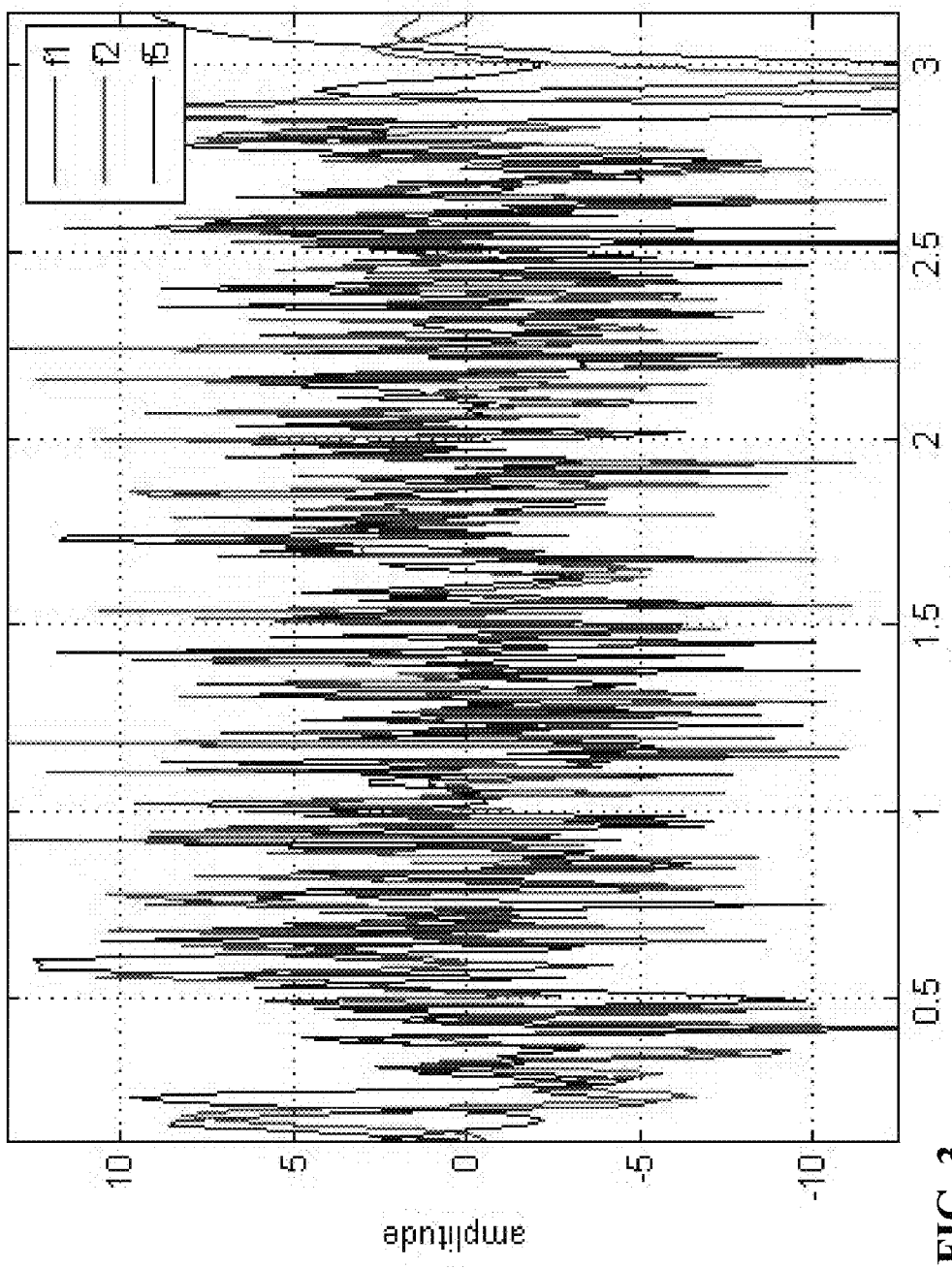
FIG. 3 illustrates 1-D receive antenna patterns for first, second and fifth frequency step examples; the first frequency is at 10 GHz, the second frequency is incremented by 15.6 MHz, and the fifth frequency is incremented by 4 times 15.6 MHz.

Simulations were run to investigate the 1-D antenna patterns of stationary targets and the cost function of moving targets. The parameters for the simulation were selected with the competing goals of having a low cost system and having near orthogonal antenna patters. Simulations were performed with a carrier frequency of 10 GHz, bandwidth of 1 GHz, 64 frequency steps, 64 antenna elements with $\lambda/2$ antenna element spacing and Gaussian beam patterns centered at broadside with 1-way 3 dB beamwidths of 120 degrees, and delay lines lengths that were randomly selected with a uniform distribution between 0 and $20\lambda$. FIG. 3 shows the antenna patterns for the first frequency at 10 GHz, the second frequency which is incremented by 15.6 MHz, and the fifth frequency which is incremented by 4 times 15.6 MHz.

Figure 4:
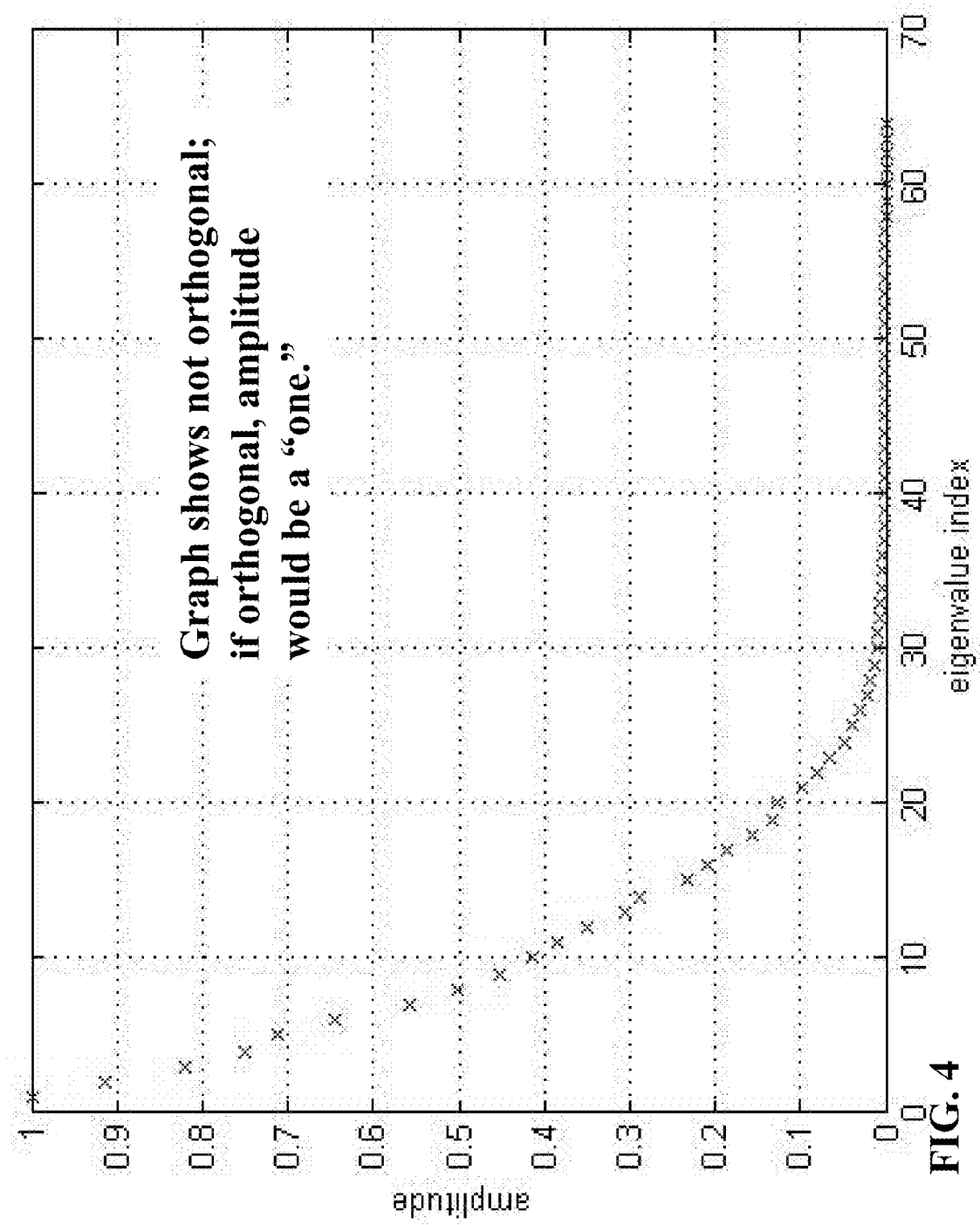
FIG. 4 show the eigenvalues associated with the simulation parameters; with the results indicating that eigenvalues are near zero around the $30^{th}$ eigenvalue.

The orthogonality of the antenna patterns can be analyzed by performing a single value decomposition (SVD) on the observation matrix calculated in Equation (12). FIG. 4 show the eigenvalues associated with the simulation parameters. The results indicate that eigenvalues are near zero around the $30^{th}$ eigenvalue. Clearly, the antenna patterns are not orthogonal. The rank of the matrix can be improved by using more elements, longer delay lines, and more bandwidth, but it is never full rank for a realizable system.

Figure 5:
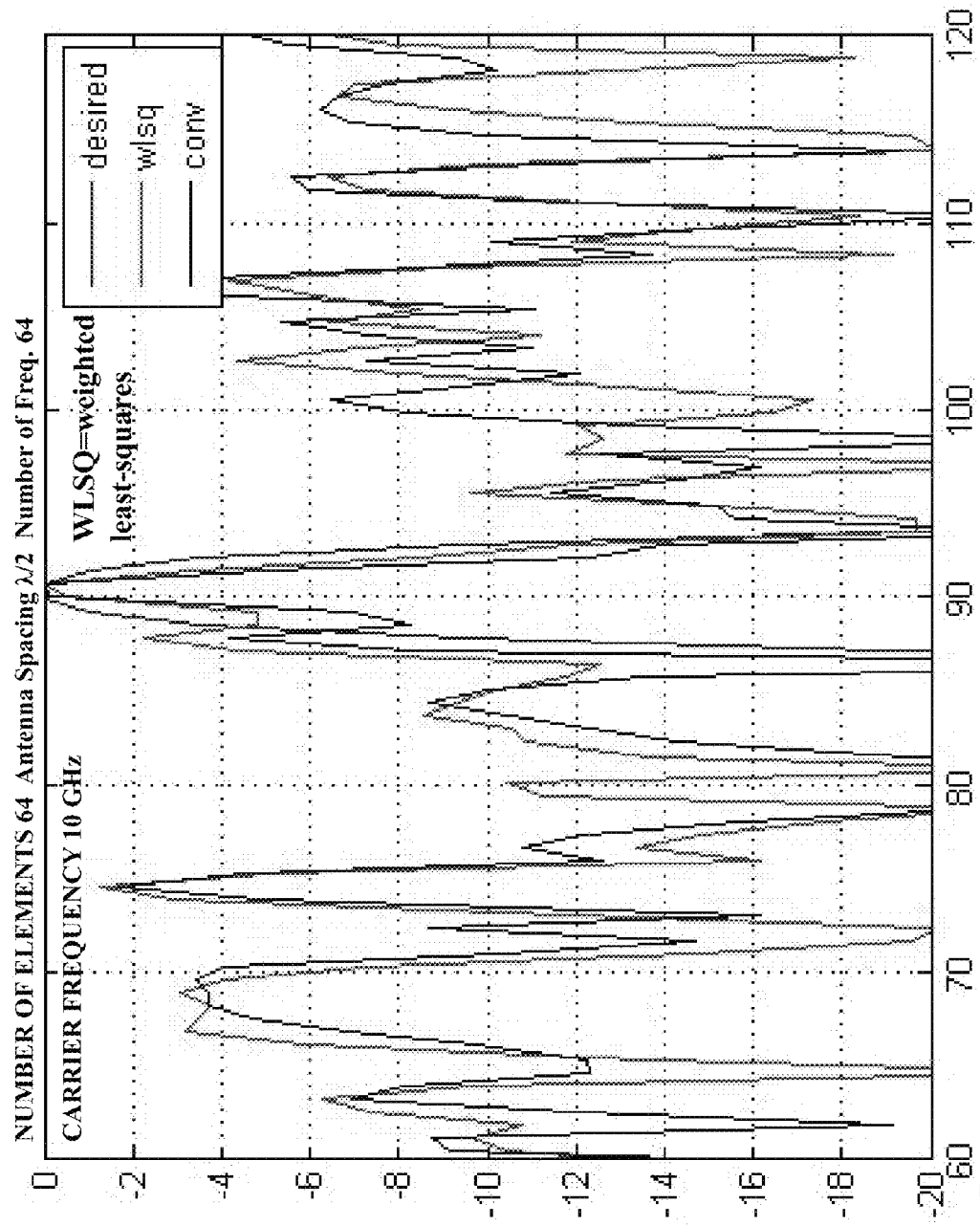
FIG. 5 is a graphical illustration of a simulated 1-D antenna pattern using matched filter and WLSQ approaches.

1-D antenna patterns were simulated using algorithms based upon matched filter processing and weighted least squares (WSLQ). The matrices required for the WLSQ fit were generated by sampling the array manifold vector in angle every $\pi/512$ radians and the matrix inverse was computed in Matlab using the pseudo inverse function. The results are shown in FIG. 5. The red curve shows the results for a WSLQ fit to the desired antenna pattern shown by the blue curve, and the black curve is generated using conventional or a matched filter approach. As expected, the sidelobes are high.

The sidelobes levels in the antenna patterns can be reduced using adaptive digital signal processing techniques that do not distort the desired signal response while minimizing the signals from another direction. Mathematically, these conditions are described using $$w^H V(\theta_0) = 0 \quad (13)$$

$$\frac{w^H V(\theta_d)}{\|V(\theta_d)\|} = 1 \quad (14)$$

where $\theta_d$ is the desired angle, $\theta_0$ is the desired null angle, and $\|\;\|$ is the Euclidian norm. The corresponding filter coefficients can be calculated by projecting the unconstrained solution or the matched filter solution on to the subspace constrained by Equation (13) [6–van trees]. The corresponding projection matrix is given by $$P_{\theta_0} = V(\theta_0)[V(\theta_0)^H V(\theta_0)]^{-1} V(\theta_0)^H \quad (15)$$

and the resulting coefficients are given by $$w_j^H = V(\theta_d)(I_M - P_{\theta_1}). \quad (16)$$

To reduce the side-lobes, the estimated signal strength at a given angle can be calculated (e.g., via processing system 95) using coefficients calculated at a desired angle that include the additional constraint of a null at a selected angle. In accordance with a preferred embodiment methodology, these equations will reduce the sidelobe level at a desired angle. To reduce all the significant sidelobes, the null angle is scanned while keeping the desired angle fixed, then finding the minimum response as shown below. The beam pattern is determined by varying the null angle, then keeping the minimum output signal for an array of beam patterns at each angle as shown below in Equation (17):

$$Y(\theta) = \min|w_j^H V(\theta)|, j = 1 \ldots J. \quad (17)$$

where $w_j$ are the coefficients calculated for the jth null angle, $v(\theta)$ is a $M \times 1$ array manifold vector for a given angle that is a function of frequency step number, as described in more detail in S. M. Kay, Fundamentals of Statistical Signal Processing: Estimation theory, Prentice-Hall, 1993, hereby incorporated by reference. This procedure requires that only one signal be present. For applications where the targets are sparse, and the signals can be separated in Doppler, this may be a reasonable assumption. If there is more than one target, then the additional targets need to be located, then nulled, before the new target is detected. This will require an additional degree of freedom for each additional target, and will slightly degrade performance of the algorithm. The results from FIG. 5 were reprocessed using Equation (17).

Figure 6:
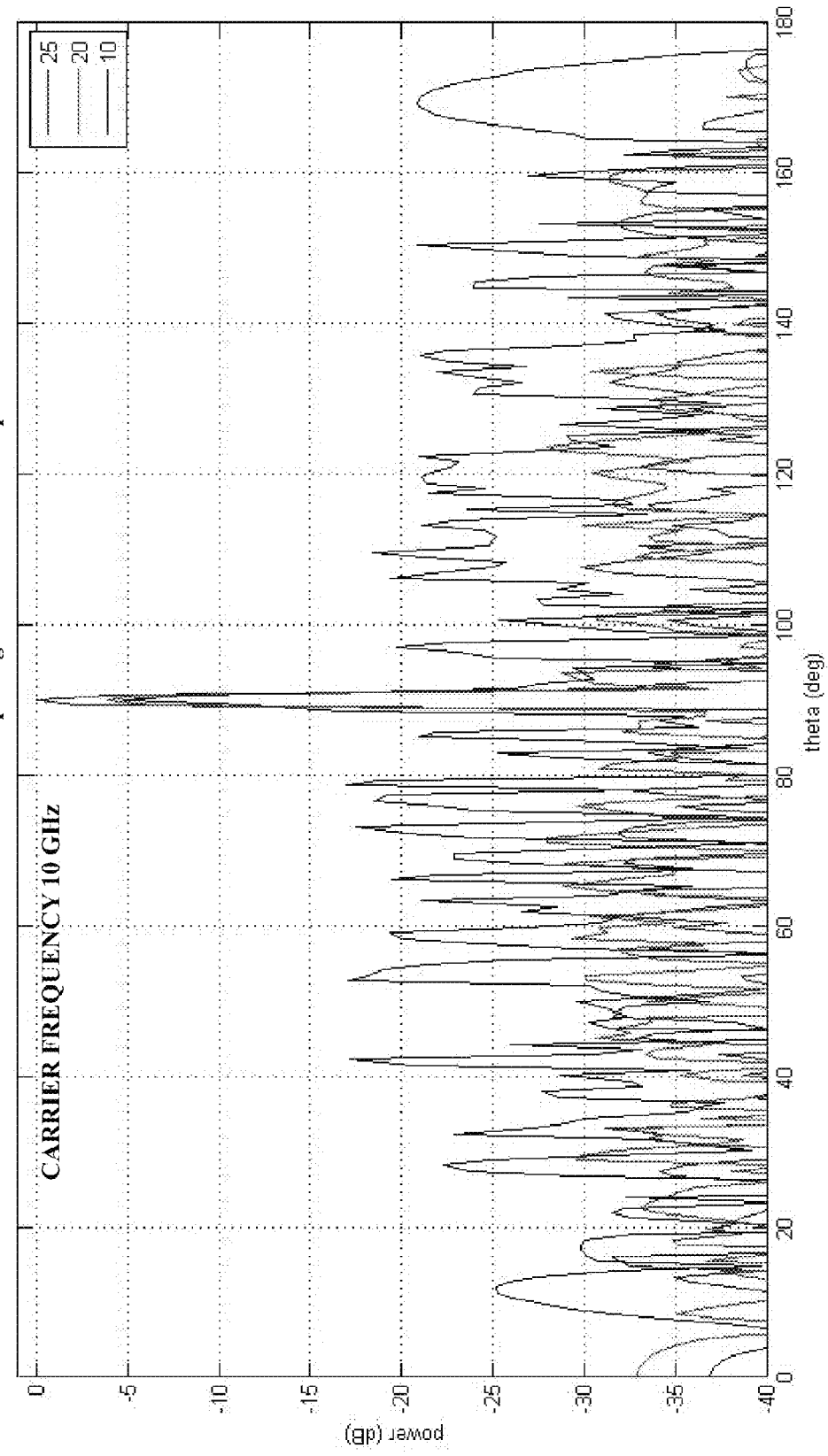
FIG. 6 illustrates 1-D antenna patterns simulated for SNR of 10, 20, and 25 dB.
Figure 7:
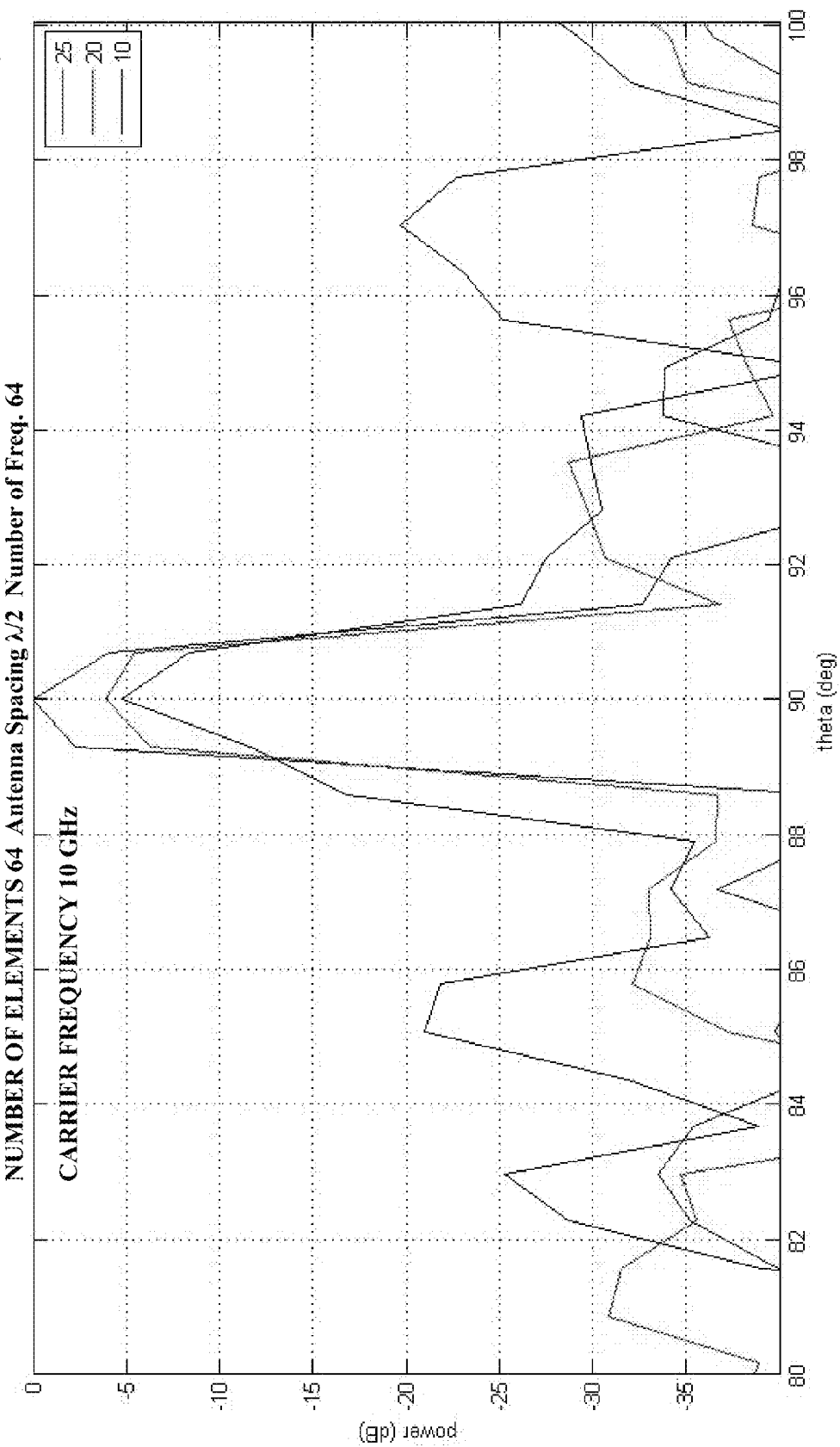
FIG. 7 illustrates zoomed in 1-D antenna patterns were simulated for SNR of 10, 20, and 25 dB.
Figure 8:
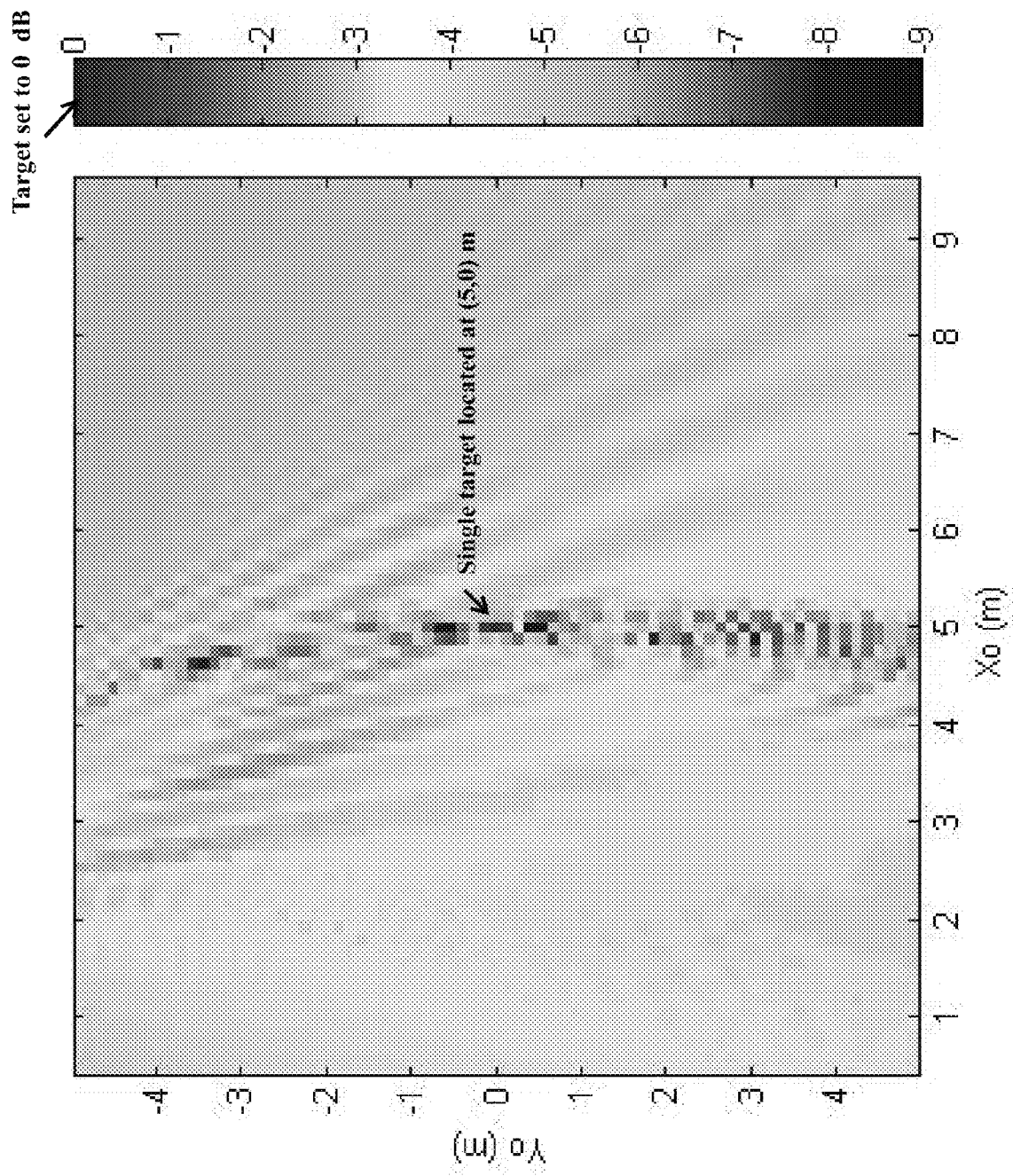
FIG. 8 illustrates a cost function example for a single target located at (5,0) m.
Figure 9:
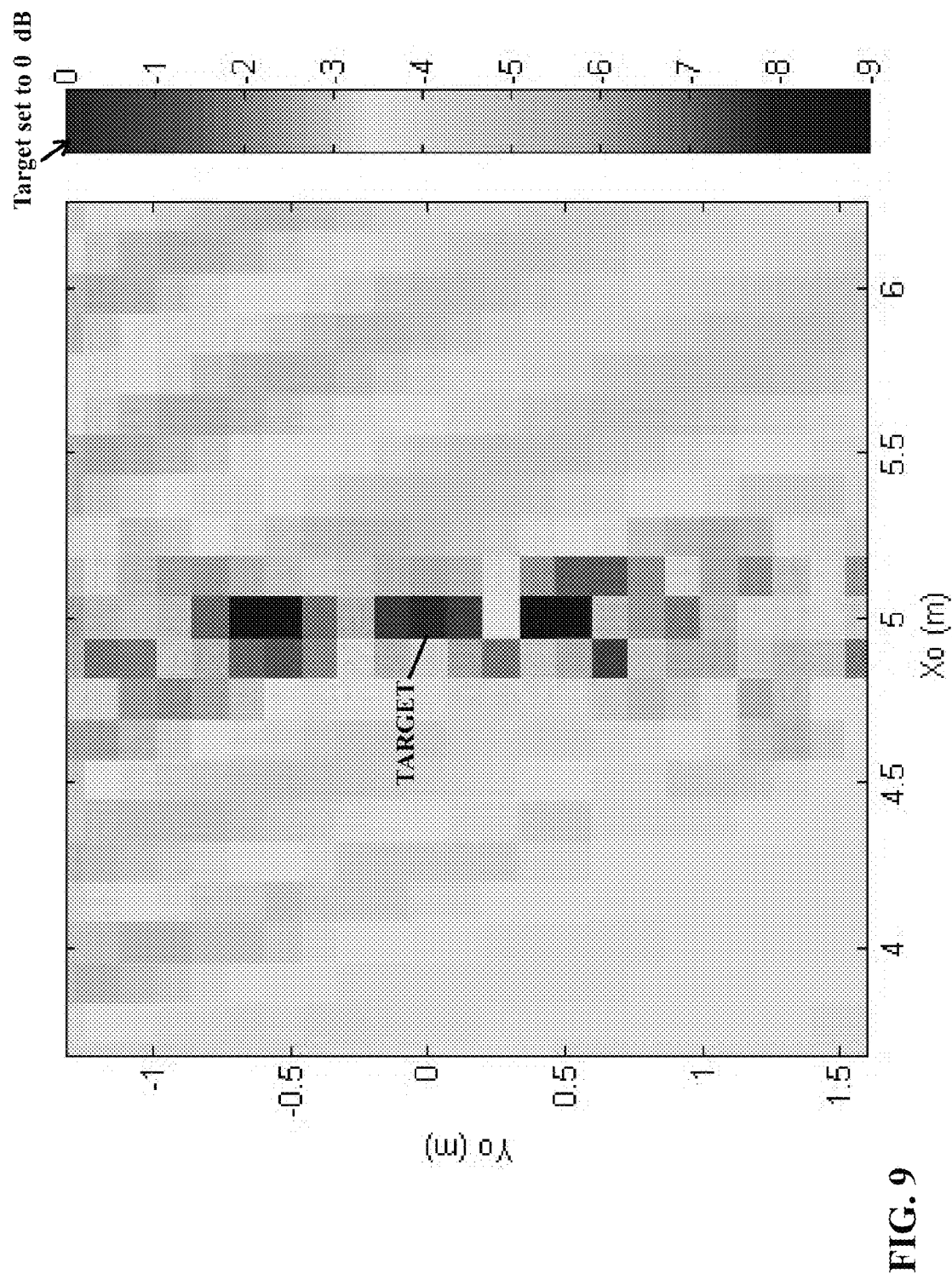
FIG. 9 illustrates a cost function example zoomed in for a single target located at (5,0) m.
Figure 10:
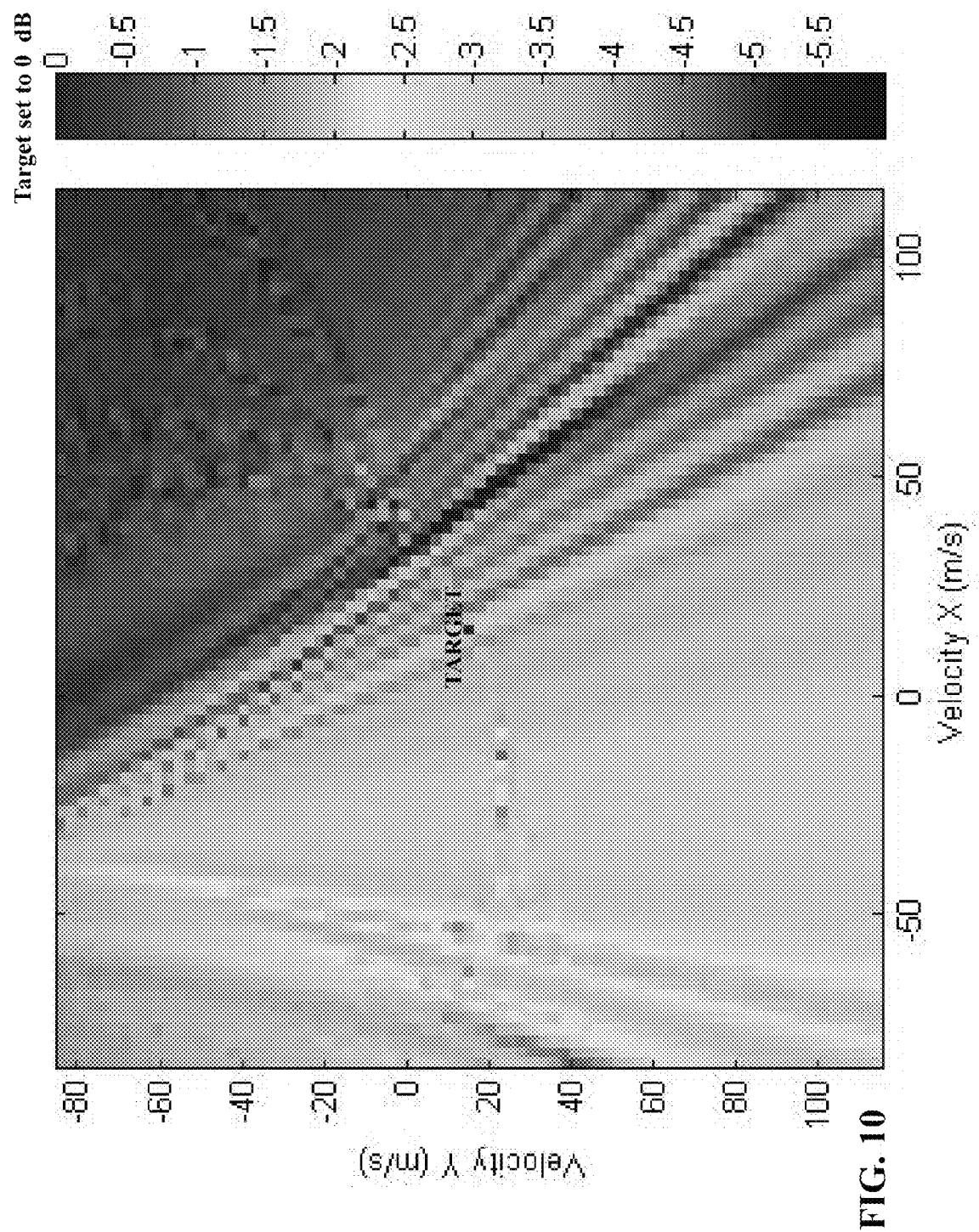
FIG. 10 illustrates the cost function example for a single target with a velocity vector of (15,15) m/s.

1-D antenna patterns were simulated for signal-to-noise ratios (SNR) of 10, 20, and 25 dB as shown in FIGS. 6 and 7. The SNRs were calculated for a single antenna element. The array of null angles went from $-\pi/2$ to $\pi/2$ in $\pi/256$ increments, with the region at the desired angle$\pm\pi/128$ excluded. The antenna patterns were calculated at angles going from $-\pi/2$ to $\pi/2$ in $\pi/256$ increments, but were offset by $\pi/512$.

The results indicate that the maximum peak sidelobe level is approximately 15 dB below the signal of interest for an SNR of 10 dB. The performance improves with increasing SNR. The Rayleigh criterion for angular resolution for a linear array at broadside is given by $$\Delta\theta = \left(\frac{c}{L(f_0 + B/2)}\right) \quad (18)$$

For the parameters selected, this corresponds to an angular resolution of approximately 0.03 radians or 1.7 degrees. This angular resolution was almost achieved in the resulting plots shown in FIG. 7.

The simulation results indicate that reasonable 1-D patterns can be generated for stationary targets. The sidelobe levels in the 1-D patterns improve as the number of elements and the fractional bandwidth is increased. The performance also improved as the number of frequencies is increased, but levels off as it approaches the number of antenna elements. For the parameters selected, reasonable sidelobe levels required a relatively high SNR.

Cost/Value Function Analysis

A radar system based upon a preferred embodiment architecture detects, then estimates the location and velocity of targets in its field of view. The relationship between the parameters required for tracking and the target returns is complex, and cannot be estimated using conventional radar signal processing algorithm. However, the estimation problem can be formulated as a nonlinear optimization problem of a cost function. The cost function can be minimized using a variety of techniques depending upon the application.

Genetic algorithms, simulated annealing, or particle swarm algorithms can be used to minimize cost functions with multiple local minimums. Reference is made to Mordecai Avriel, "Nonlinear Programming: Analysis and Methods," Dover Publishing., 2003, for further explanation (hereby incorporated by reference). These techniques can be combined with traditional approaches such as gradient descent, Newton's method, or Nelder-Mead method once the global minimum is located. Reference is made to J. A. Nelder and R. Mead, Computer Journal, 1965, vol 7, pp 308-313, hereby incorporated by reference.

One possible cost function to minimize the Euclidian or $L_2$-norm is $$\min_{(A_p, \vec{x}_p, \vec{v}_p, \phi_p)} \left\{ \left\| D(m, k) - \sum_{p=1}^{P} \hat{D}(m, k, A_p, \vec{x}_p, \vec{v}_p, \phi_p) \right\| \right\} \tag{19}$$

where $A_p$ is the amplitude of the pth scattering center, $\vec{x}_p$ is the position of the pth scattering center, $\vec{v}_p$ is the velocity of the pth scattering center, $\phi_p$ is the phase of the ith scattering center, P is the total number of target scattering centers, $D(m,k)$ is the DFT of n data values measured at the $m^{th}$ frequency step, k is the Doppler bin number, and $\hat{D}(m,k,A_p, \vec{x}_p, \vec{v}_p, \phi_p)$ is the predicted value of $D(m,k)$. The above may prove to be a complicated optimization problem, but for some applications, the number of targets in each Doppler bin should be zero or one, and for many applications there is only one or a few scattering centers per target, which should simplify the problem considerably.

2-D slices of the cost function described in Equation (19) were generated for a target with an initial position of (5,0) m and a velocity of (15,15) m/s in the x-y plane, with no phase offset, acceleration, or noise using the same radar parameters as previously described for the 1-D antenna simulation. 2-D slices of the cost functions were plotted in FIGS. 8-11 as a function of position and velocity, while the other parameters were fixed at their correct values. The plot increments are at 0.8 of the theoretical range and velocity resolution derived from the Rayleigh criterion.

The theoretical angular resolution for a stationary target given by the Rayleigh criterion is by $$\Delta\theta = \left( \frac{c}{L\cos(\alpha)(f_0 + B/2)} \right). \tag{20}$$

where $\alpha = a \tan(0/5) = 1$. The figures are plotted at increments given by $$\Delta x = 0.8 \left( \frac{c}{2B} \right) \tag{21}$$

$$\Delta y = 0.8 (r \Delta\theta) \tag{22}$$

$$\Delta V = 0.8 \left( \frac{\lambda}{4T} \right) \tag{23}$$

where c is the speed of light, B is the bandwidth of the transmitted signal, r is the range (5 m), and T is the time for each step frequency waveform.

For these simulated parameters, the target is clearly localized in velocity and downrange with resolution equal to the Rayleigh criteria, but the minimum associated with the crossrange position of the target has a relatively low separation between competing local minimums. The localization of the crossrange position will be more sensitive to noise, but the global minimum is centered around the correct value and is slightly wider than the value predicted by the Rayleigh criteria. This result is expected, since the stationary 1-d antenna patterns also had large sidelobes. The sidelobes of the cost function plots can be improved by changing the radar and waveform parameters. Increases in the percent bandwidth of the waveform, the length of the time delays, and the number of elements will reduce the sidelobes in the plots of the cost functions. Also, performance improvements can be achieved by extended this concept from a single array with one ADC to multiple subarrays with a dedicated ADC for each subarray. These results indicate that it is possible to estimate the position and velocity of a point scatter target from 2-D slices of the proposed cost function with resolution close to the Rayleigh criterion.

As described herein, a preferred embodiment radar architecture comprises a single input and single output that supports 3-d electronically scanning of moving targets with high spatial resolution. The architecture is based upon a frequency scanning antenna with random length feed lines. The feasibility of the architecture to perform target localization in position and velocity was confirmed by analyzing 1-D antenna patterns and a cost function based upon an $L_2$-norm. As described above, a single realization of the system was selected, simulated, and analyzed. The results indicate that the concept is feasible, but require a high SNR and complex signal processing.

For the selected parameters, the 1-D antenna patterns generated using matched filter and weighted least squares processing had high sidelobe levels. To improve the results, the sidelobes were nulled over all angles except the desired angular region. A final antenna pattern was formed by taking the minimum value of each antenna pattern at every angle. This resulted in antenna patterns with resolution predicted by classical array theory, but it required increased signal processing and it is susceptible to interference by other targets. Although 1-D antenna patterns were described in the foregoing description, 2-D patterns can be generated using the same techniques.

Target localization will require nonlinear optimization of a cost function. 2-D slices of a cost function base upon $L_2$ norm indicate that global minimum exist for localizing simple targets. However, the y-position estimate had a relatively small separation between other competing local minimum. The range and velocity resolution seen in the plots of the cost function are consistent with the range and velocity resolution calculated from the Rayleigh criterion.

Generally, the solution to the localization algorithm may be calculated off the radar platform. Doppler detections that exceed a given threshold could be wirelessly transmitted to a central computer for more processing. This will reduce the cost, size, and power requirements of the radar front end. The power, size, and cost of the central computer system would be larger than traditional radar systems, but it could serve multiple roles and be located in a secure location with adequate resources.

Radar system 1, shown in FIG. 1, can also detect, and then estimate, the location and velocity of targets in its field of view. The relationship between these parameters and the target returns is can be viewed as a nonlinear optimization problem of a cost function.

As explained above, a cost function for a non-linear optimization problem can be minimized using a variety of techniques. For example, genetic algorithms, simulated annealing, or particle swarm algorithms may be used to minimize cost functions with multiple local minimums. These techniques can be combined with traditional approaches such as gradient descent, Newton's method, or Nelder-Mead method once the global minimum is located.

For example, one possible cost function to minimize the Euclidian or $L_2$-norm of the cost function given by Equation (18):

$$\min(A_p, \vec{x}_p, \vec{v}_p, \phi_p) \left\{ \left\| D(m,k) - \sum_{p=1}^{P} (\hat{D}(m, k, A_p, \vec{x}_p, \vec{v}_p, \phi_p)) \right\| \right\} \quad (18)$$

where $A_i$ is the amplitude of the $i^{th}$ scattering center, $x_i$ is the position of the $i^{th}$ scattering center, $v_i$ is the velocity of the $i^{th}$ scattering center, $\phi_i$ is the phase of the $i^{th}$ scattering center, I is the total number of target scattering centers, D(m,k) is DFT of n data values measured at the $m^{th}$ frequency step, k is the Doppler bin, and $\hat{D}(m,k,A_p,\vec{x}_p,\vec{v}_p,\phi_p)$ is the predicted value of D(m,k).

Figure 12:
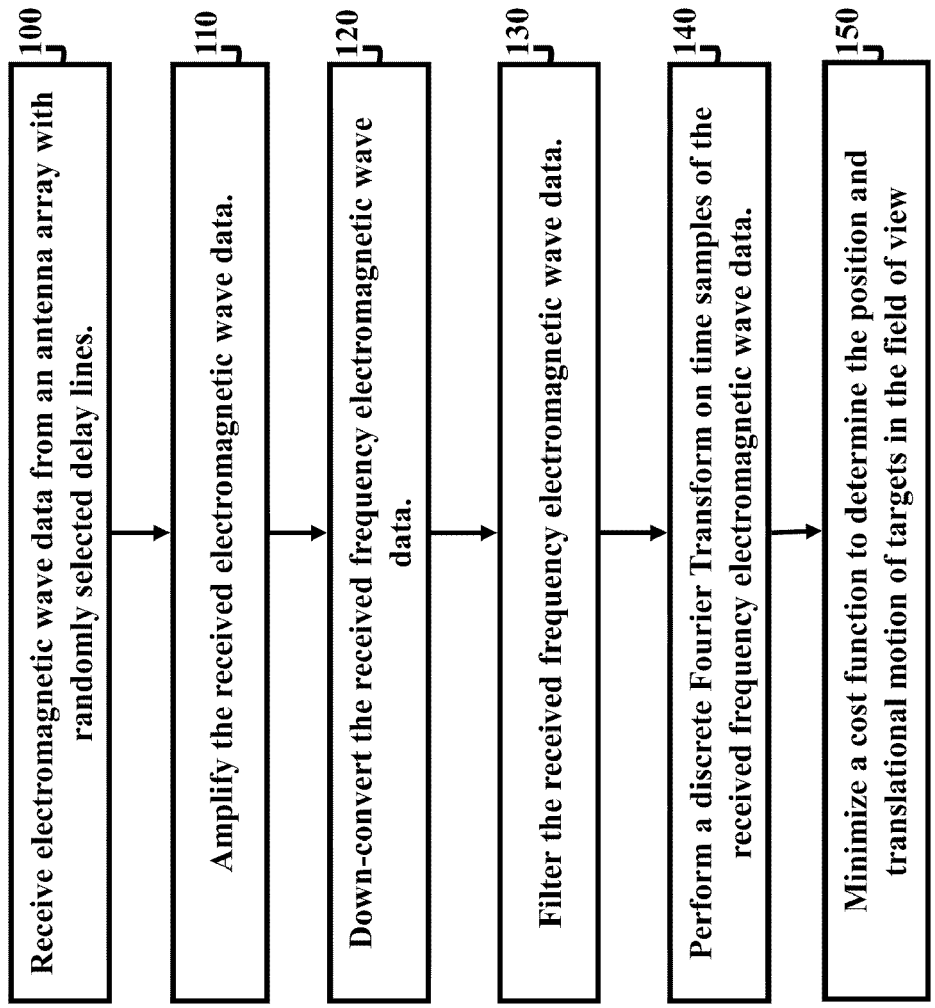
FIG. 12 is a flow diagram illustrating a preferred method according to an embodiment herein.

FIG. 12, with reference to FIG. 1, illustrates a flow diagram according to an embodiment herein. In the method shown in FIG. 12, step 100 describes receiving electromagnetic wave data from an antenna array with randomly selected delay lines (e.g., antenna array 40). Step 110 describes amplifying, using an amplifier (e.g., amplifier 60), the received electromagnetic wave data. Step 120 describes down-converting, using a down-converter, the received electromagnetic wave data. Step 130 describes filtering, using a band pass filter (e.g., Band Pass Filter 70), the received electromagnetic wave data. Step 140 describes performing a discrete Fourier Transform on time samples of the received electromagnetic wave data (e.g., using processing system 95). Next, at step 150, the method of FIG. 2 describes minimizing a cost function to determine the position and translation motion of targets in the field of view (e.g., using processing system 95).

The techniques provided by the embodiments herein may be implemented on an integrated circuit chip (not shown).

The embodiments herein can take the form of an entirely hardware embodiment, or a combination of software and hardware embodiment (i.e. an embodiment including both hardware and software elements). The embodiments that are implemented in software include but are not limited to, firmware, resident software, microcode, etc.

Furthermore, the software described herein can take the form of a computer program product accessible from a computer-usable or computer-readable medium providing program code for use by or in connection with a computer or any instruction execution system.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
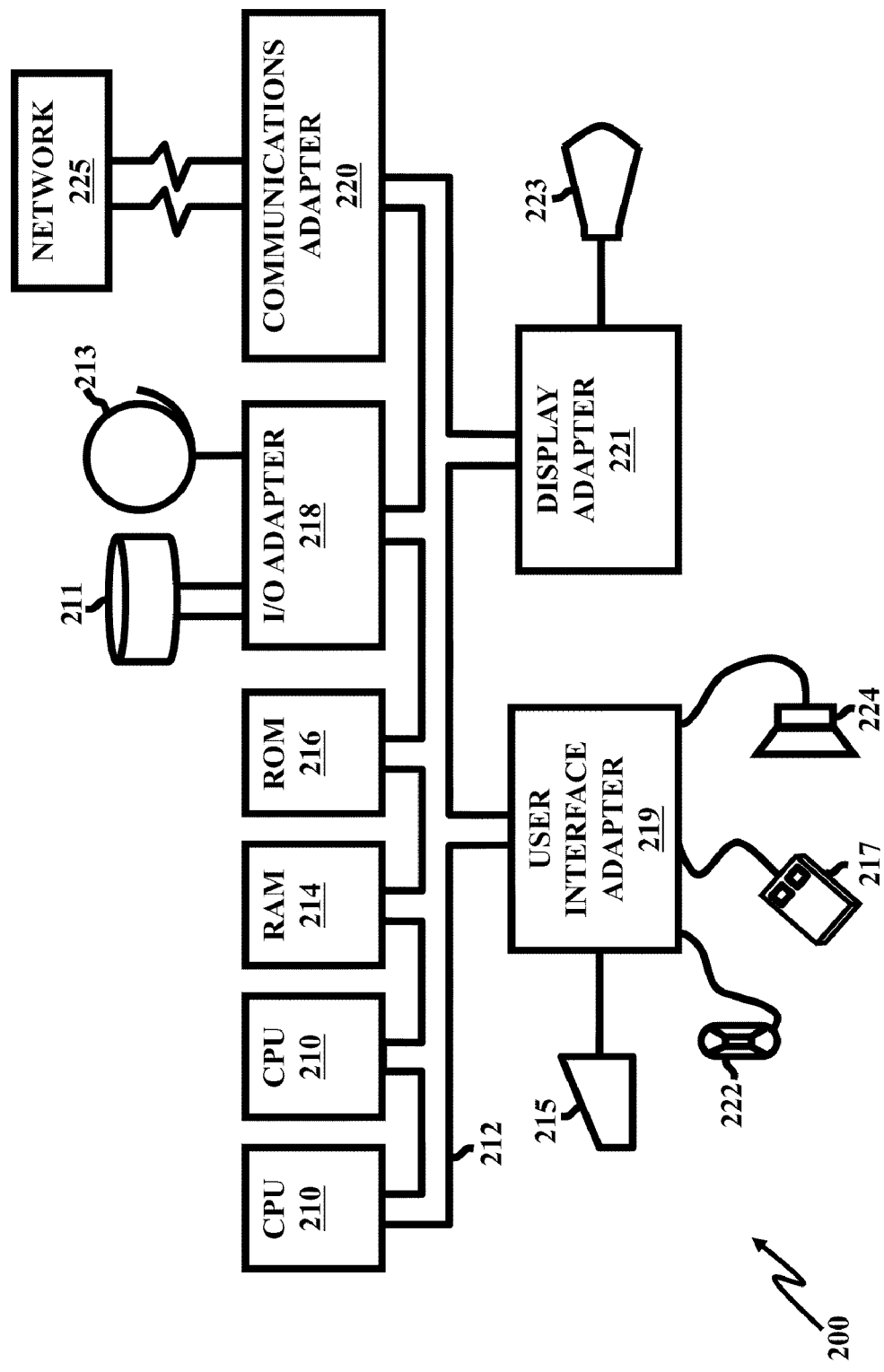
FIG. 13 illustrates a schematic diagram of a computer architecture used in accordance with at least one embodiment herein.
Figure 14:
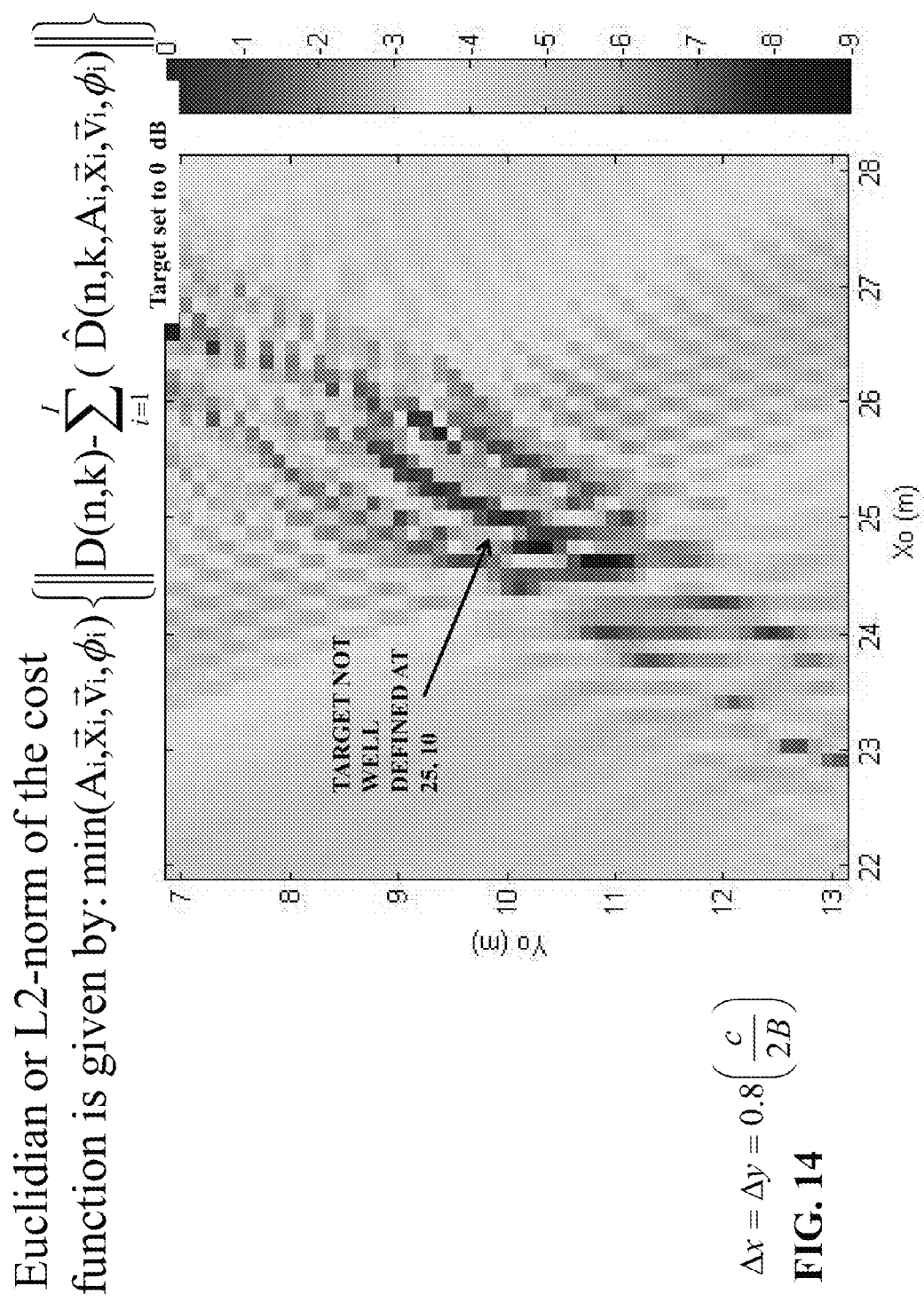
FIG. 14 illustrates a cost function example for a single target located at (25,10) meters.
Figure 15:
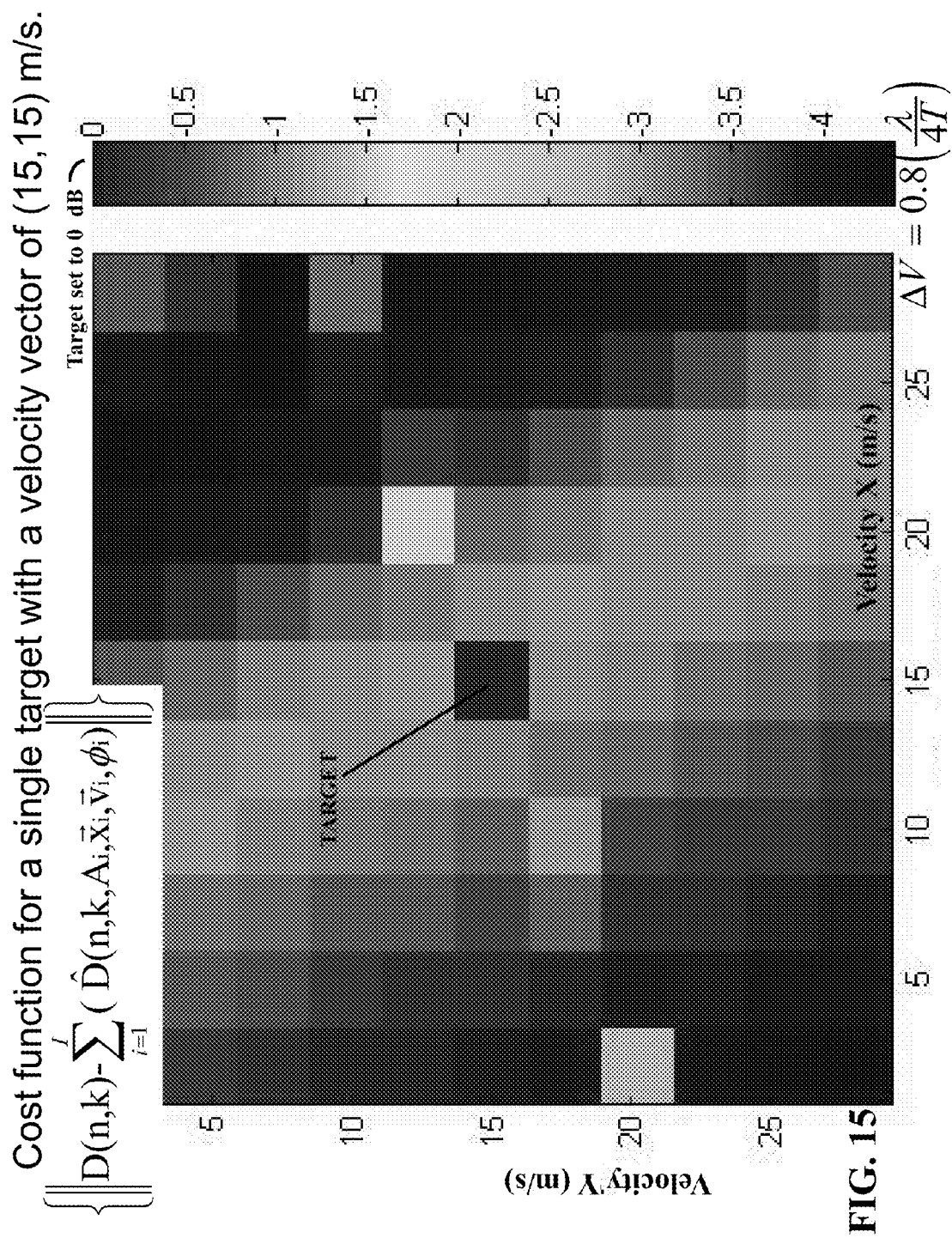
FIG. 15 illustrates a cost function example for a single target with a velocity vector of (15,15) meters per second.

A more general representation of the hardware environment for practicing the embodiments herein is depicted in FIG. 13. This schematic drawing illustrates hardware configuration 200 of an information handling/computer system in accordance with the embodiments herein. Hardware configuration 200 comprises at least one processor or central processing unit (CPU) 210. The CPUs 210 are interconnected via system bus 212 to various devices such as a random access memory (RAM) 214, read-only memory (ROM) 216, and an input/output (I/O) adapter 218. The I/O adapter 218 can connect to peripheral devices, such as disk units 211 and tape drives 213, or other program storage devices that are readable by the system. The system can read the inventive instructions on the program storage devices and follow these instructions to execute the methodology of the embodiments herein. The system further includes a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device 223 that may be embodied as an output device such as a monitor, printer, or transmitter, for example.

A preferred embodiment of the present invention provides a large trade space for optimizing the radar configuration-bandwidth; number of antenna elements; number of frequencies; angular and range resolution equal to Rayleigh criterion and the concept is feasible for short range Doppler radar.

As used herein, the terminology "resolving power" relates to the ability of the imaging system to measure the angular separation of the points. The terminology "resolution" or "minimum resolvable distance" is the minimum distance between distinguishable objects in an image.

As used herein, the terminology "Rayleigh Criterion" means the standard criterion used to characterize the spatial resolution of an imaging system based upon the minimum resolvable detail for an imaging system; i.e., how close two points can be to each other before they become indistinguishable. The criterion is satisfied when the central maximum of the Airy Disk of one imaged point falls below the first minimum of the other. Resolution of images are limited by diffraction when the first diffraction minimum of the image of one source point coincides with the maximum of another. In the case of a single slit, the wavelength is equal to the slit width and the angle for the first diffraction minimum is 90°. The criterion relates to how finely an optical system is able to distinguish the location of objects that are near each other. The criterion for resolution is that the central ring in the diffraction pattern of one image should fall on the first dark interval between the Airy disk of the other and its first diffraction ring. For an objective lens of diameter d (circular aperture) utilizing light with a wavelength λ, the formula for the criterion is approximated by 1.22×λ/d.

As used herein, the terminology "processor" means CPU, computer, PC, laptop computer, notebook computer, microprocessor, multiprocessor, minicomputer, main frame computer, or a combination thereof.

As used herein, "orthogonality" is defined as occurring when two vectors in space are at right angles, their dot product is zero. The condition of orthogonality is when x·y=0.

As used herein the terminology "down converted" refers to the definition know in the art of signal processing. For example, down conversion results when a digital down-converter (DDC) converts a digitized real signal centered at an intermediate frequency (IF) to a basebanded complex signal centered at zero frequency.

As used herein, the terminology "unequal spacing between antenna elements" means that the distances between the antenna elements is not equal.

As used herein, the terminology "nonplanar antenna elements" means that the antenna elements are not positioned in a single plane.

As used herein, the terminology "stepped frequency" refers to the application of a waveform at each frequency step (or hop). Stepped frequency includes the stepped change of radiated signal frequency over a range of defined discrete frequencies (frequency changing with random frequency steps periodically in time). Stepped frequency includes changing of the spectrum central frequency of radiated narrow-band signals in successive times (periodically) over the range of discrete frequencies, and/or discrete changing of the spectrum central frequency of radiated narrow-band signals over the defined group or range of discrete frequencies according to a random low in successive times.

As used herein, the terminology "norm" of a mathematical object is a quantity that in some (possibly abstract) sense describes the length, size, or extent of the object. A norm is a function that assigns a strictly positive length or size to all vectors in a vector space, other than the zero vector. ||normalx||=square root $(x_1^2+x_2^2 \ldots +x_n^2)$.

As used herein, the terminology "Euclidian norm" relates to the magnitude assigned in a 2-dimensional Euclidean space R2. Where elements in this vector space are usually drawn as arrows in a 2-dimensional Cartesian coordinate system starting at the origin (0,0), the length of the vector (arrow) is the Euclidean norm. On Rn, the intuitive notion of length of the vector x=[x1, x2, . . . , xn] is captured using the Pythagorean Theorem.

As used herein the terminology "optimization" means choosing the best value or values from some set of available alternatives.

As used herein the terminology "optimization of a function" means finding "best available" values of the function given a defined domain.

As used herein, the terminology "optimization problem" refers to a problem of finding the best solution from all feasible solutions. In mathematical terms, an optimization problem A is a quadruple (I,f,m,g), where I is a set of instances; given an instance, f(x) is the set of feasible solutions; given an instance x and a feasible solution y of x, m(x,y) denotes the measure of y, which is usually a positive real. g is the goal function, and is either min or max. The objective is then to find for some instance x an optimal solution; a feasible solution y with M(x,y)=g{m(x,y')|y'ϵf(x)}.

As used herein the terminology "delay line" (or "delay lines") means any sort of transmission line, or circuit, device, or an electric network approximation of a delay line, which, if terminated in its characteristic impedance, will reproduce at its output a waveform applied to its input terminals with known distortion, but delayed in time by an amount dependent upon the electrical length (or electrical characteristics of the circuit, device or network) of the line.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A radar system for detecting targets comprising:
at least one radar transmitter for transmitting an electromagnetic waveform;
a receiving antenna comprising a plurality of receiving antenna elements and delay lines, each of the plurality of receiving antenna elements receiving the return signal operatively associated with a predetermined delay line;
each delay line having a delay length which produces a different phase delay in the return signal; the different phase delays producing substantially different antenna patterns for the received signal at a given frequency;
at least one processor operatively connected to receive data from the plurality of delay lines; the at least one processor operating to analyze the substantially different beam patterns associated with different frequencies using an optimization technique over all of the frequencies;
whereby the processing of the data produces results indicating the presence and location of a target.

2. The system of claim 1 wherein the radar transmitter transmits continuous waveforms at stepped frequencies and the processing of the results using an optimization technique comprises solving an optimization problem.

3. The system of claim 1 wherein each of the delay lines produces a different, predetermined delay such that there is a random distribution of delay line lengths over a range exceeding 10λ and wherein there is nonplanar, unequal spacing between the plurality of receiving antenna elements.

4. The system of claim 1 wherein the return signals from each delay line randomly interfere with each other when summed and wherein the delay lines comprise a substantially uniform distribution of delay lines over a 20λ range which produces a plurality of substantially different antenna patterns for different frequencies when processed using at least one processor.

5. The system of claim 1 wherein the optimization technique is nonlinear and the data from the plurality of delay lines is processed to detect and estimate the location and velocity of targets in the field of view using the nonlinear optimization technique.

6. The system of claim 5 wherein the nonlinear optimization technique utilizes a cost function minimization technique, and the at least one processor calculates a minimum value of the Euclidean norm of the cost function $$\min(A_p, \vec{x}_p, \vec{v}_p, \phi_p)\left\{\left\|D(m,k) - \sum_{p=1}^{P} (\hat{D}(m, k, A_p, \vec{x}_p, \vec{v}_p, \phi_p))\right\|\right\}$$

where $A_i$ is the amplitude of the $i^{th}$ scattering center, $x_i$ is the position of the $i^{th}$ scattering center, $v_i$ is the velocity of the $i^{th}$ scattering center, $\phi_i$ is the phase of the $i^{th}$ scattering center, I is the total number of target scattering centers, D(m,k) is the discrete Fourier Transform (DFT) of n data values measured at the $m^{th}$ frequency step, k is the Doppler bin, and $\hat{D}(m,k,A_p, \vec{x}_p, \vec{v}_p, \phi_p)$ is the predicted value of D(m,k).

7. The system of claim 1 wherein the velocity of the targets can be determined by performing a discrete Fourier transform (DFT) on the sampled data collected at each frequency.

8. The system of claim 1 further comprising:
an amplifier operatively associated with the plurality of delay lines, wherein the amplifier amplifies antenna signal data transmitted through the plurality of delay lines;

a down-converter operatively associated with the amplifier, wherein the down-converter down-converts the amplified antenna signal data transmitted through the plurality of delay lines;

band pass filter operatively associated with the amplifier and the down-converter, the band pass filter filters the amplified antenna signal data;

a data acquisition system operatively associated with the down-converter, the data acquisition system comprising an analog-to-digital converter, wherein the analog-to-digital converter converts the down-converted antenna signal data transmitted through the plurality of delay lines to digital sampled data; and wherein the at least one processor comprises a processing system coupled to the data acquisition system, wherein the processing system detects the targets from the antenna signal data and estimates at least one of a position, angle and velocity of the targets.

9. The system of claim 1, wherein the at least one processor calculates a statistical optimization to determine a target location.

10. The system of claim 1 wherein the number of antenna elements is in the range of 2 to 1,000,000 and preferably 16 to 100, and wherein each of the delay lines produces a different, predetermined delay such that there is a substantially uniform distribution of delay lines over a 20λ range and wherein there can be arbitrary positioning of the plurality of antenna elements.

11. A radar system for detecting targets comprising;

at least one radar transmitter for transmitting electromagnetic waves a receiving antenna comprising a plurality of receiving antenna elements with associated varying length delay lines; each delay line having a delay length which produces a different phase delay from each other delay line; the different phase delays producing different antenna patterns at a given frequency;

at least one processor operatively connected to receive the different antenna patterns and using an optimization technique the presence and location of a target is determined.

12. The system of claim 11 wherein the radar transmitter transmits substantially continuous waveforms at stepped frequencies.

13. The system of claim 11, wherein the at least one processor calculates a statistical optimization to determine a target location.

14. A method of determining location information of a target from electromagnetic wave data, the method comprising:

transmitting an electromagnetic wave utilizing a waveform generator;

receiving the electromagnetic wave data from a plurality of antenna elements, each antenna element having an associated delay line; the plurality of associated delay lines having various lengths; the electromagnetic wave data comprising delayed phase shifted and amplitude shifted waveforms;

processing the received electromagnetic wave data using at least one processor operatively connected to receive electromagnetic wave data from each delay line; the at least one processor operating to determine the target location by utilizing statistical optimization procedure.

15. The method of claim 14 wherein the waveform generator transmits waveforms at different frequencies and the electromagnetic wave data delayed phase shifted and amplitude shifted waveforms with varying levels of energy spread spatially and at different frequencies.

16. The method of claim 14 further comprising the steps of amplifying the received electromagnetic wave data and down-converting the received electromagnetic wave data, and wherein the transmitting of electromagnetic waves comprises transmitting waveforms utilizing a waveform generator that is stepped in frequency.

17. The method of claim 14 wherein the associated delay lines having long phase delays, such that each delay line puts a different phase shift on the received signal data and the phase shift changes as to function of frequency.

18. The method of claim 14 wherein the associated delay lines are structured such that there is a range in the phase delay of approximately 10λ to 30λ (each λ being 360°), and the delay lines produce a phase shift which changes as a function of frequency.

19. The method of claim 14 wherein the step of processing comprises performing a discrete Fourier Transform on time samples of the received electromagnetic wave data.

20. The method of claim 14 wherein the at least one processor calculates a statistical optimization to determine a target location.

* * * * *